(12) United States Patent
DeCenzo

(10) Patent No.: US 11,564,194 B1
(45) Date of Patent: Jan. 24, 2023

(54) DEVICE COMMUNICATION

(71) Applicant: Amazon Technologies, Inc., Seattle, WA (US)

(72) Inventor: Chris DeCenzo, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 16/914,695

(22) Filed: Jun. 29, 2020

(51) Int. Cl.
| | |
|---|---|
| *H04W 60/02* | (2009.01) |
| *H04W 8/04* | (2009.01) |
| *H04W 8/06* | (2009.01) |
| *H04L 41/046* | (2022.01) |
| *H04L 69/22* | (2022.01) |
| *H04L 41/0213* | (2022.01) |
| *H04W 8/18* | (2009.01) |
| *H04W 4/70* | (2018.01) |

(52) U.S. Cl.
CPC ......... *H04W 60/02* (2013.01); *H04L 41/0213* (2013.01); *H04L 41/046* (2013.01); *H04L 69/22* (2013.01); *H04W 4/70* (2018.02); *H04W 8/04* (2013.01); *H04W 8/06* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 2015/0282061 A1* | 10/2015 | Matthews | H04W 4/027 455/404.1 |
| 2017/0195424 A1* | 7/2017 | Nasir | H04W 4/80 |
| 2018/0279099 A1* | 9/2018 | Novo Diaz | H04W 4/70 |
| 2019/0166088 A1* | 5/2019 | Krochik | H04L 41/0876 |
| 2019/0245713 A1* | 8/2019 | Lo | H04L 12/2834 |
| 2019/0334995 A1* | 10/2019 | Shanmugam | H04L 67/12 |
| 2019/0342112 A1* | 11/2019 | Li | H04L 12/2821 |
| 2020/0126050 A1* | 4/2020 | Savolainen | H04L 41/0806 |
| 2020/0244741 A1* | 7/2020 | Di Girolamo | G06F 9/5011 |

OTHER PUBLICATIONS

G. Hu, Design and Implementation of Industrial Wireless Gateway Based on ZigBee Communication, pp. 1-5 (Year: 2009).*
W. Lee, S. Hong, Implementation of a KNX-ZigBee Gateway for Home Automation, pp. 1-5 (Year: 2009).*

* cited by examiner

*Primary Examiner* — Christopher M Crutchfield
(74) *Attorney, Agent, or Firm* — Pierce Atwood LLP

(57) ABSTRACT

A device-communication system may receive, from a user device via a first network, communication data originating from a first device connected to the user device via a second network having a type different from that of the first network. The device-communication system may process the communication data to determine a corresponding device-management system, and may communicate further with the user device for additional identification information, if necessary. The device-communication system determines which of a plurality of device-management systems should receive the communication data and sends the data to the appropriate system.

16 Claims, 21 Drawing Sheets

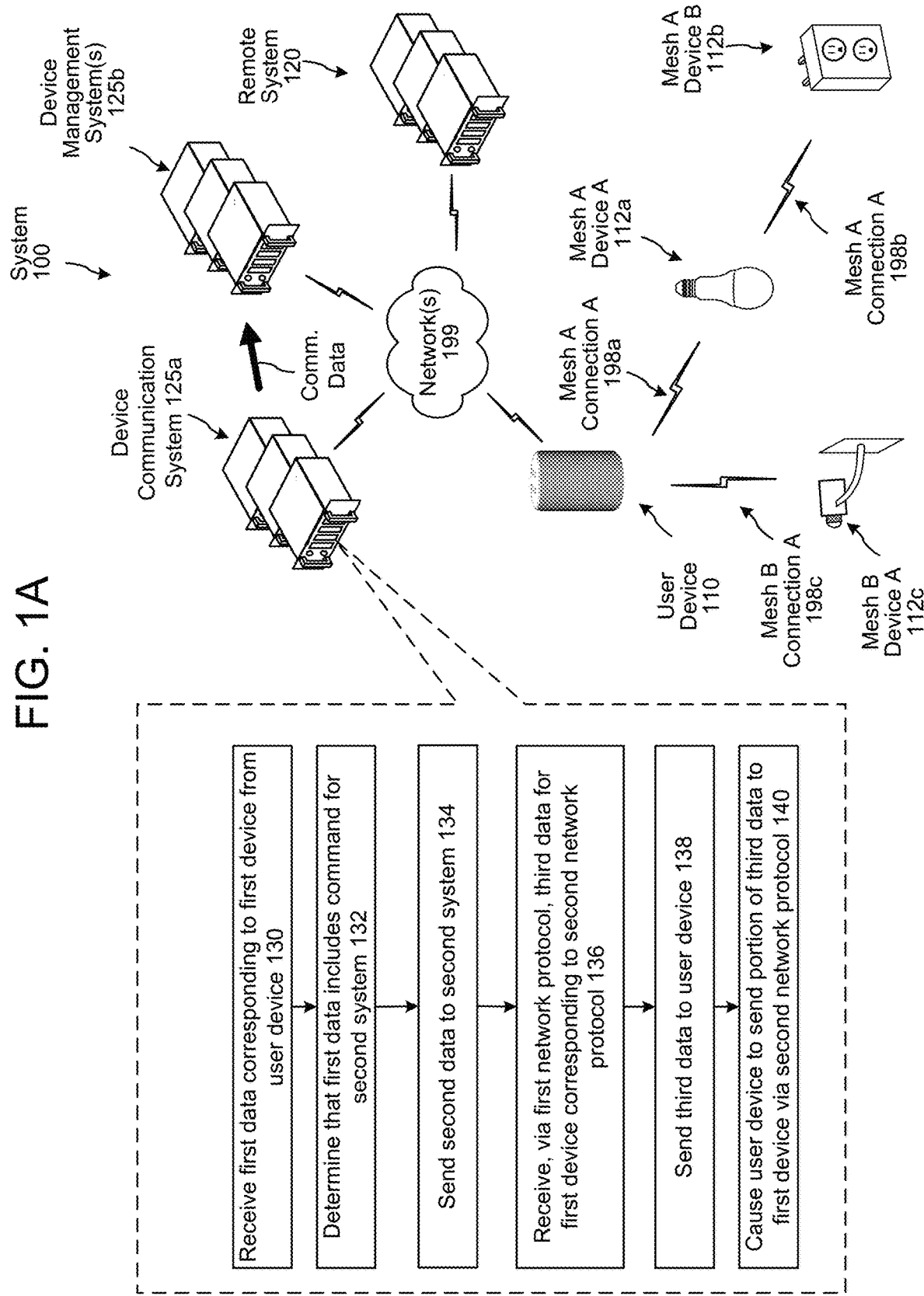

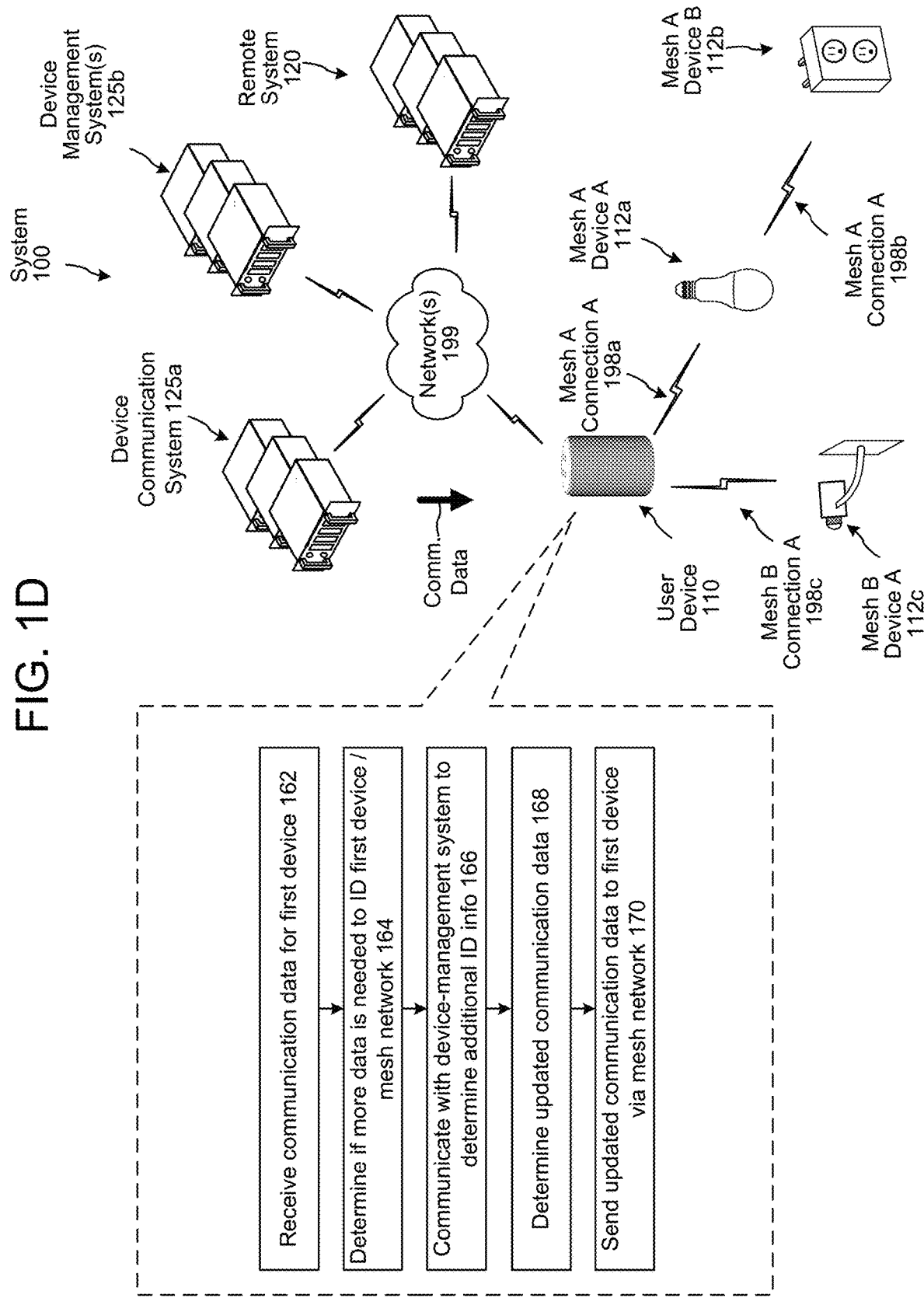

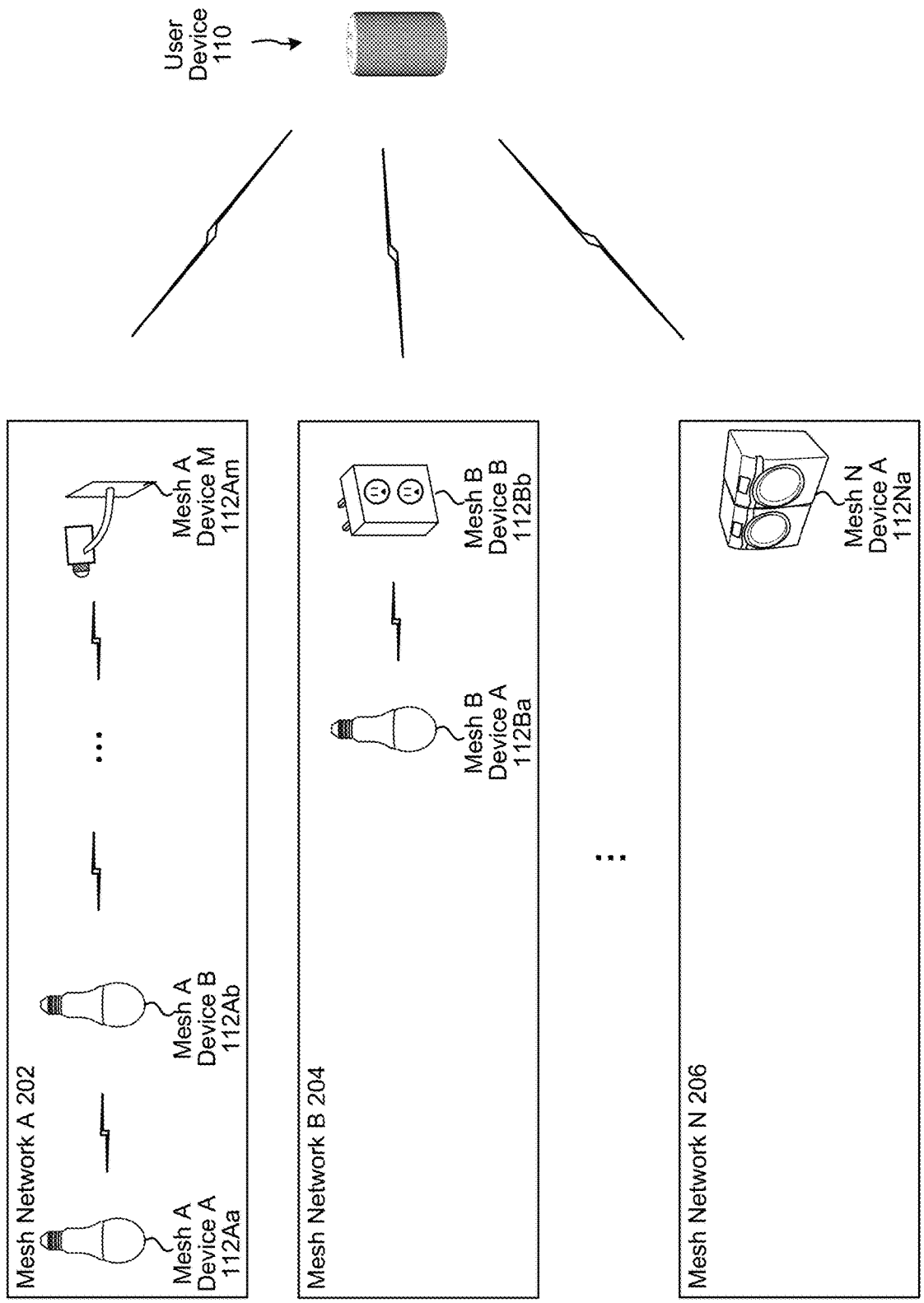

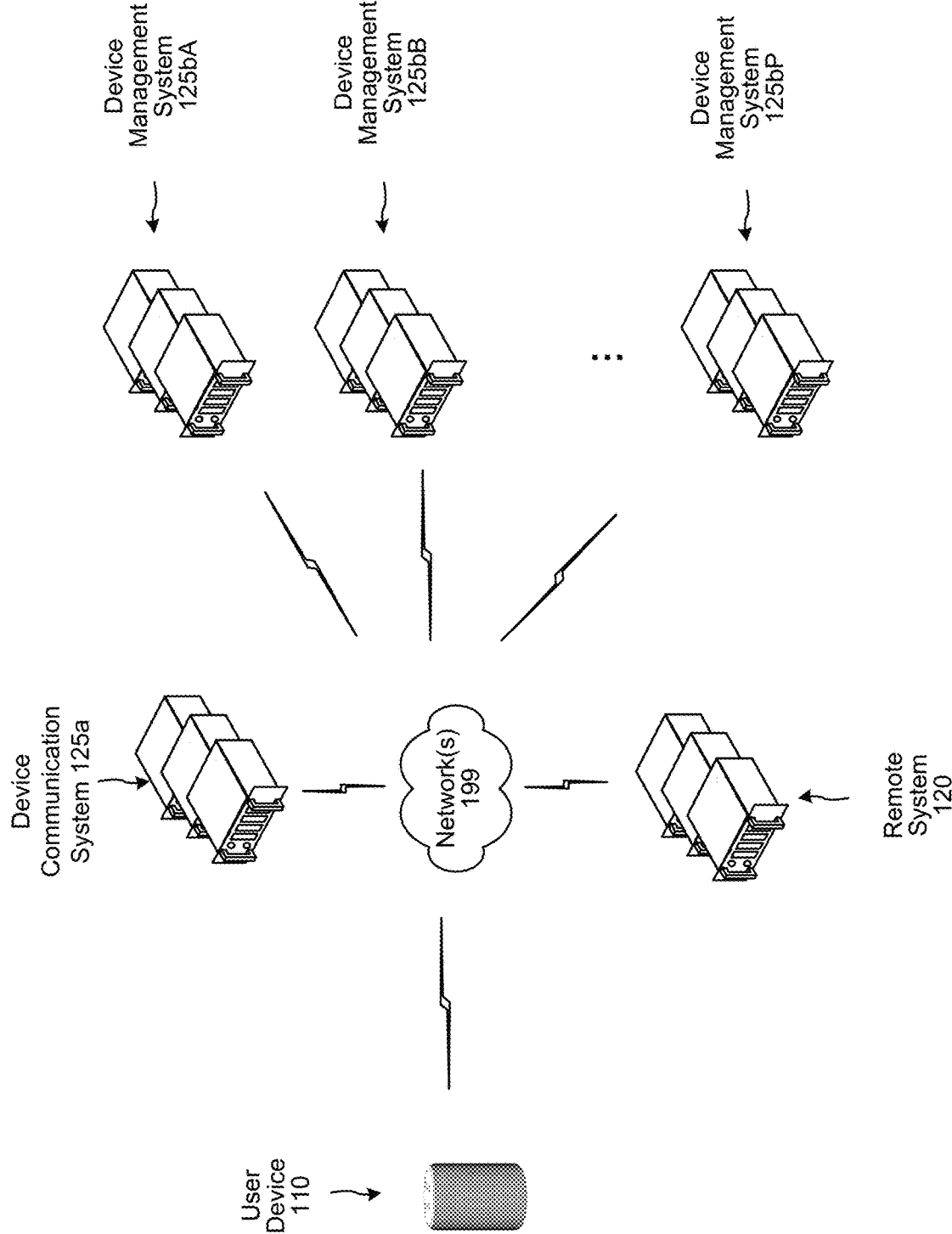

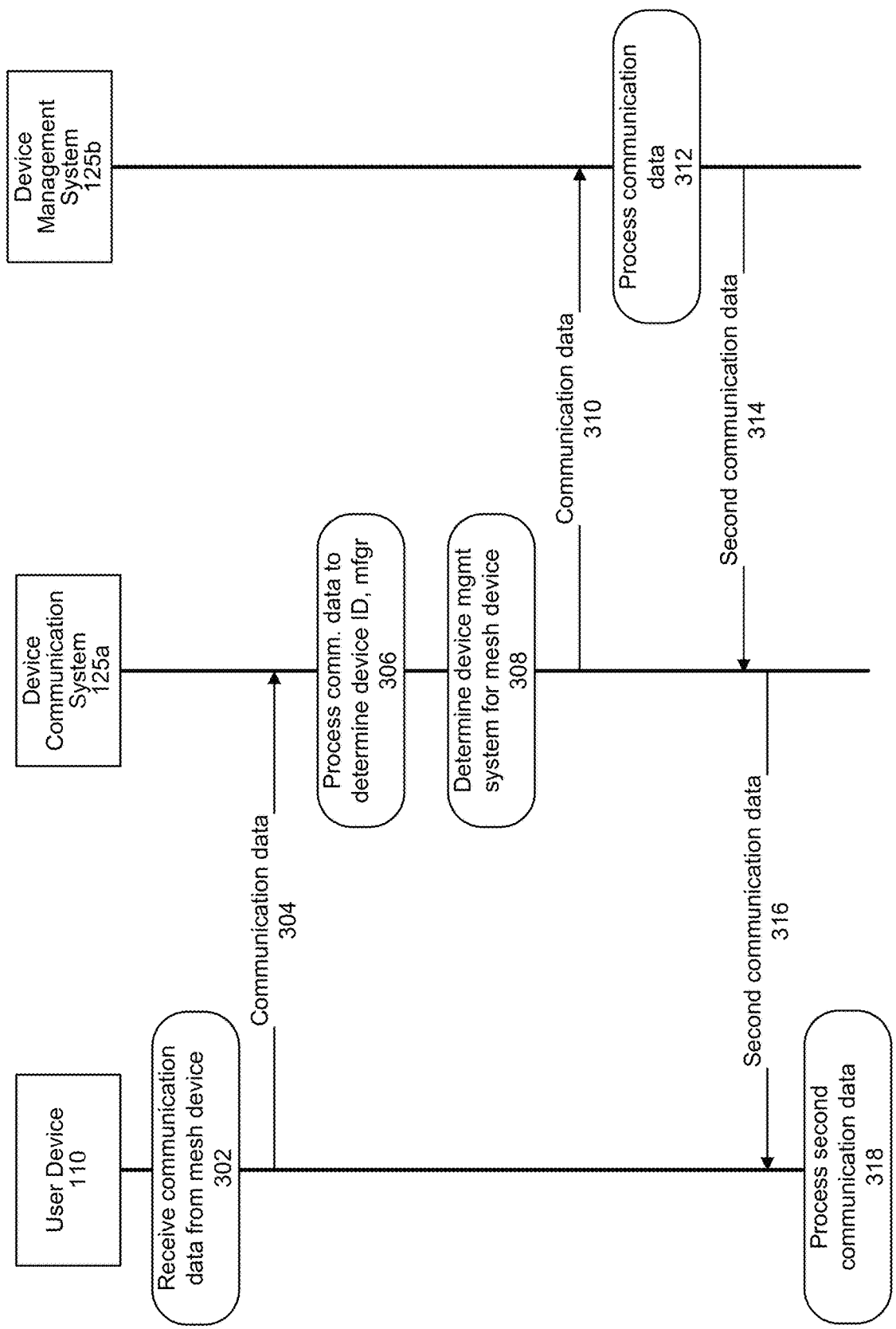

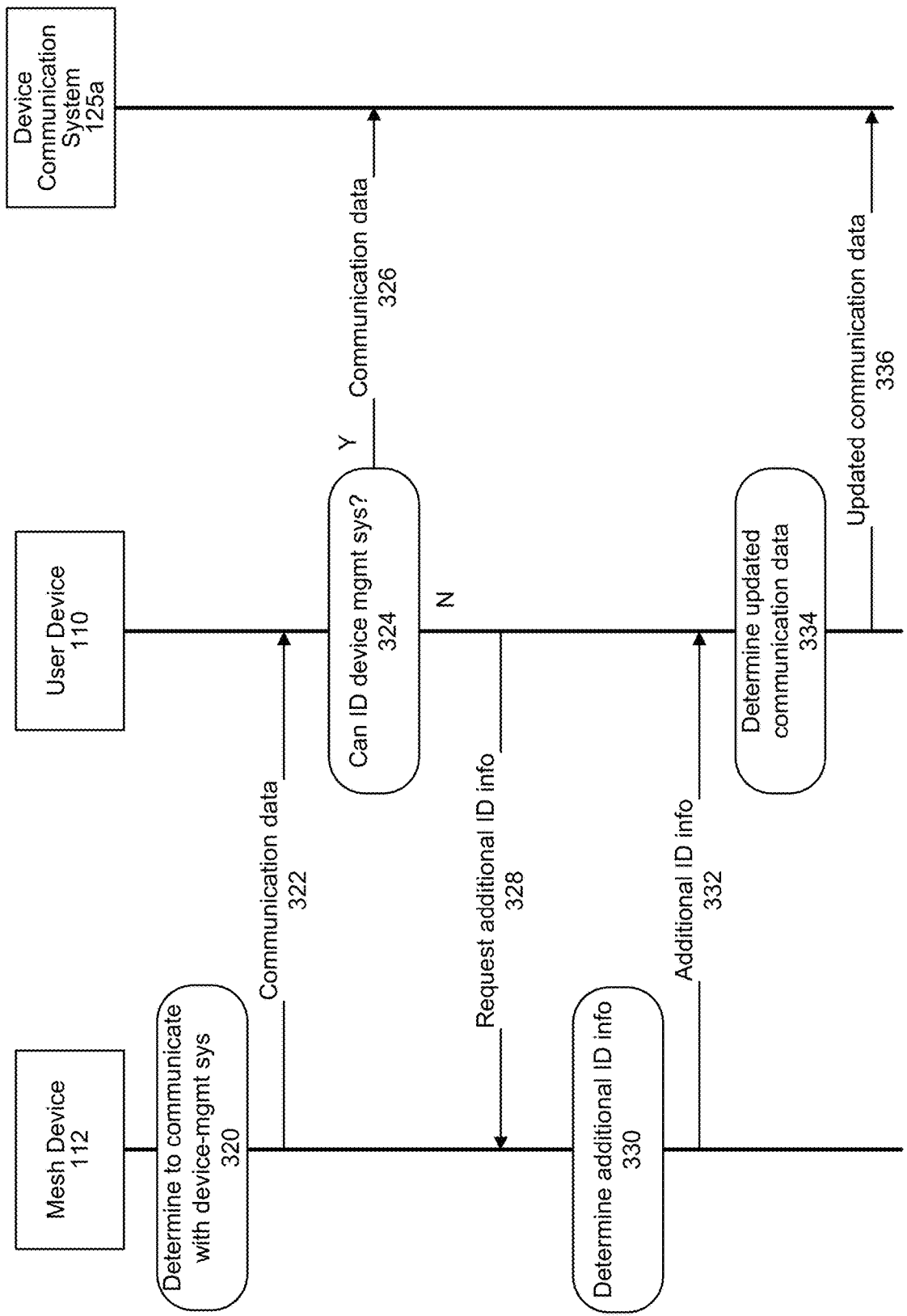

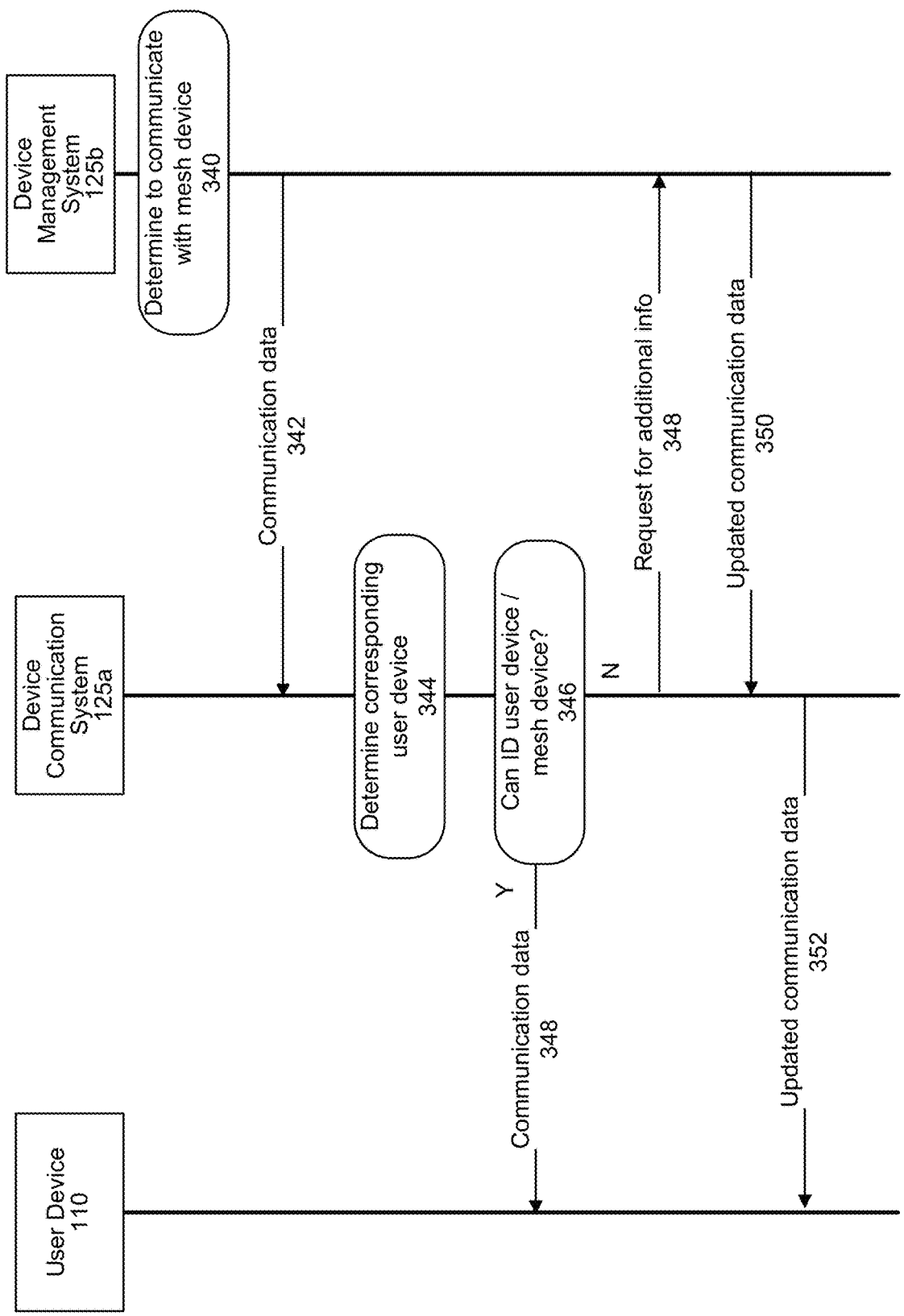

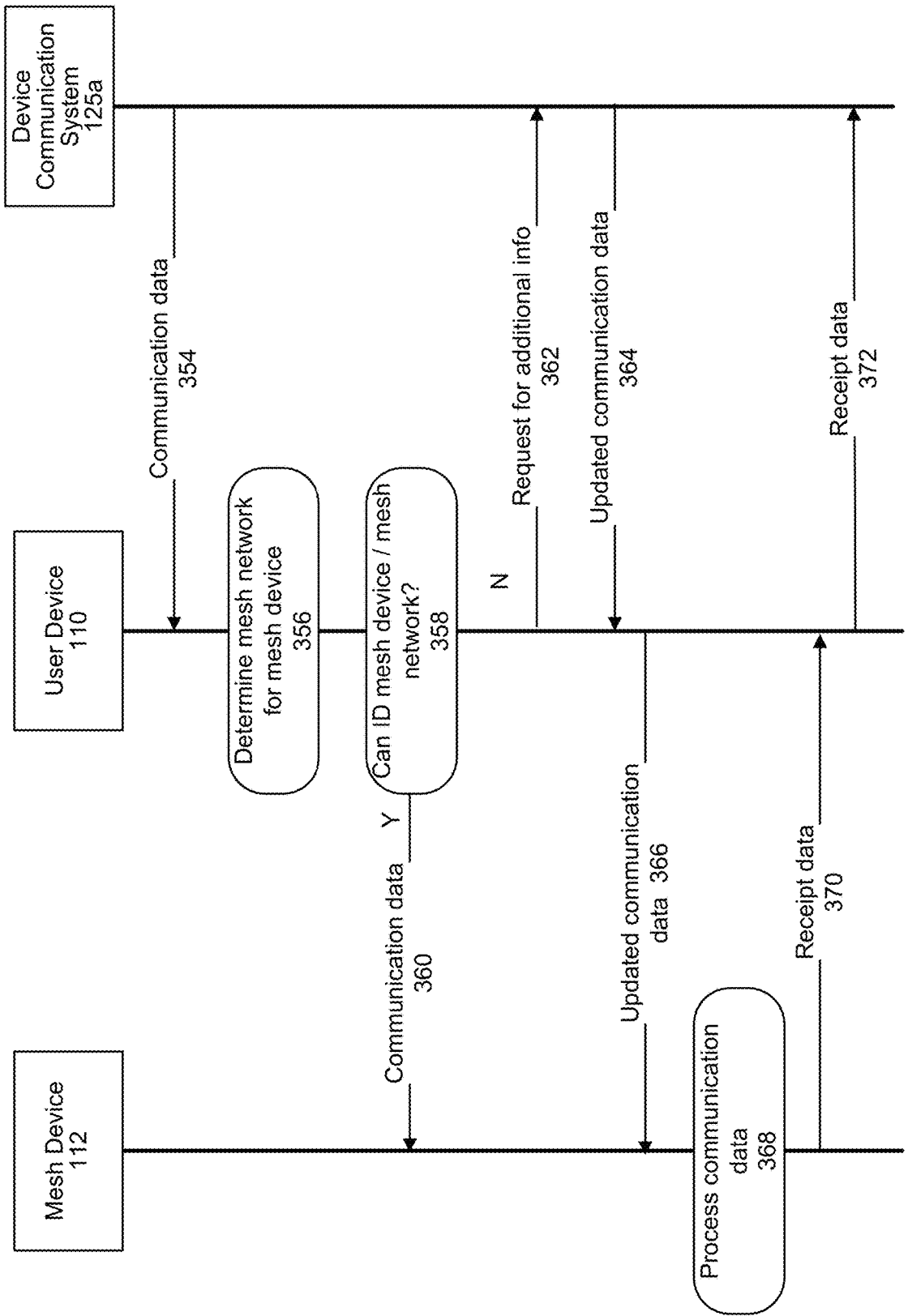

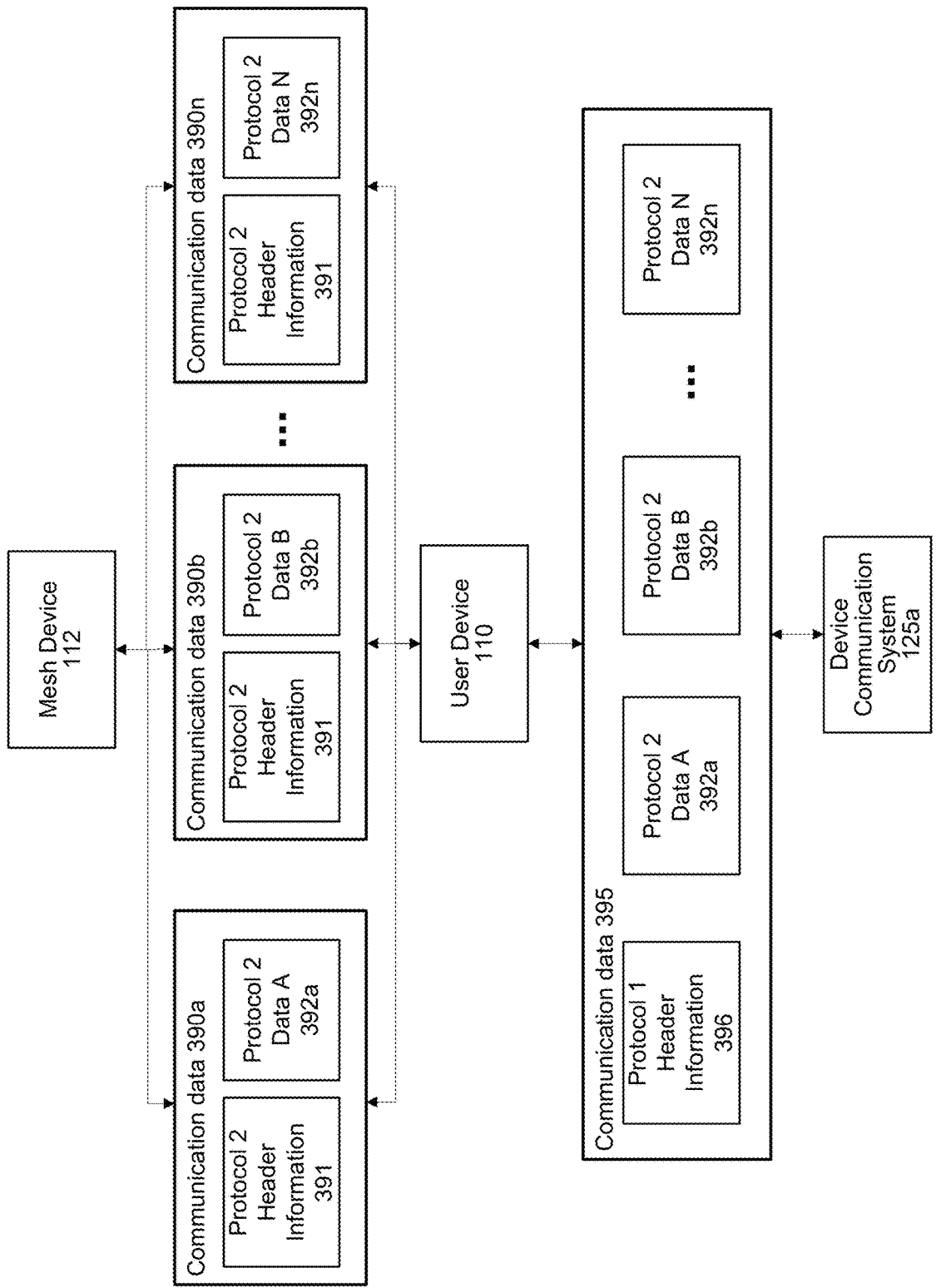

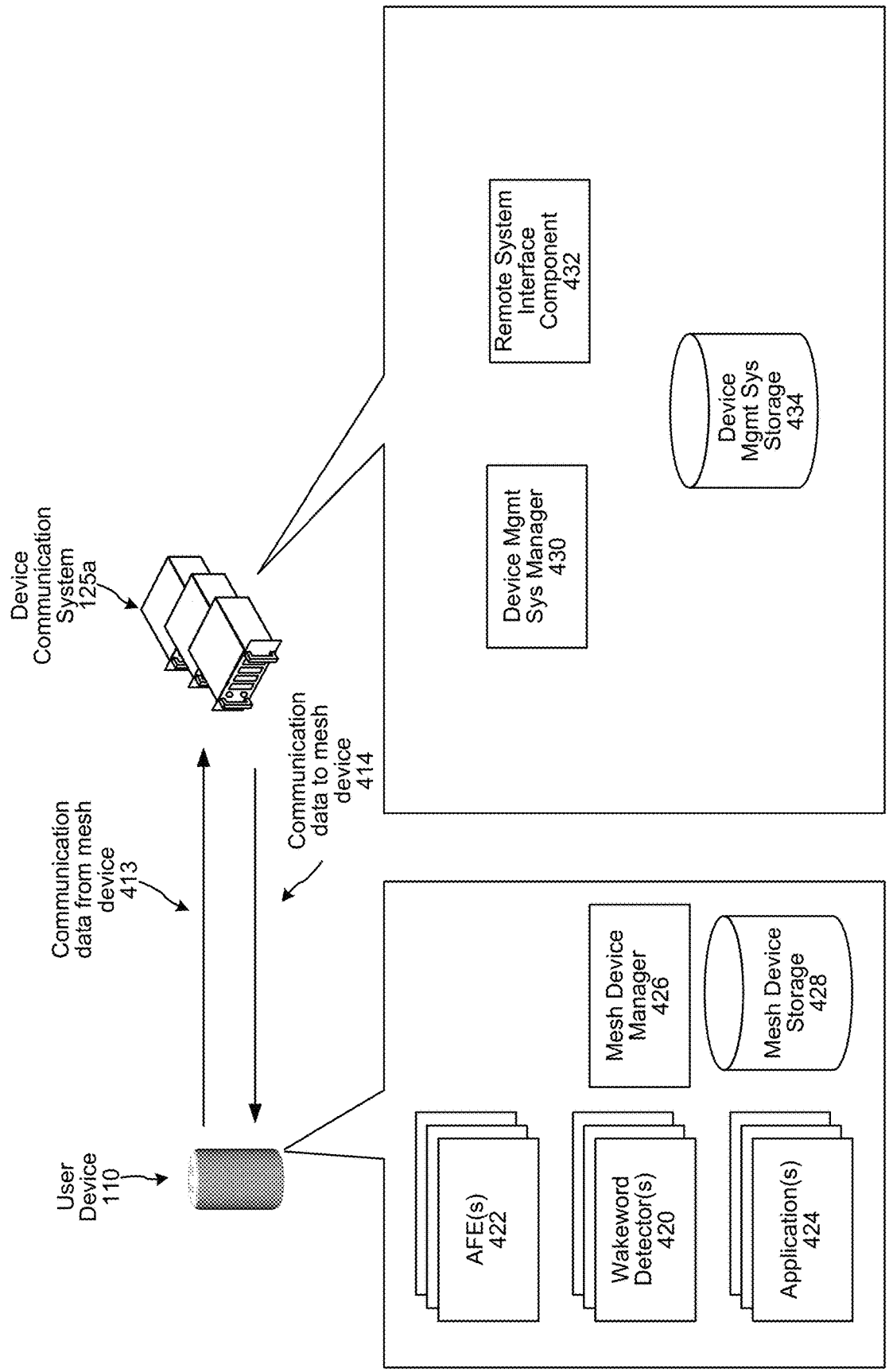

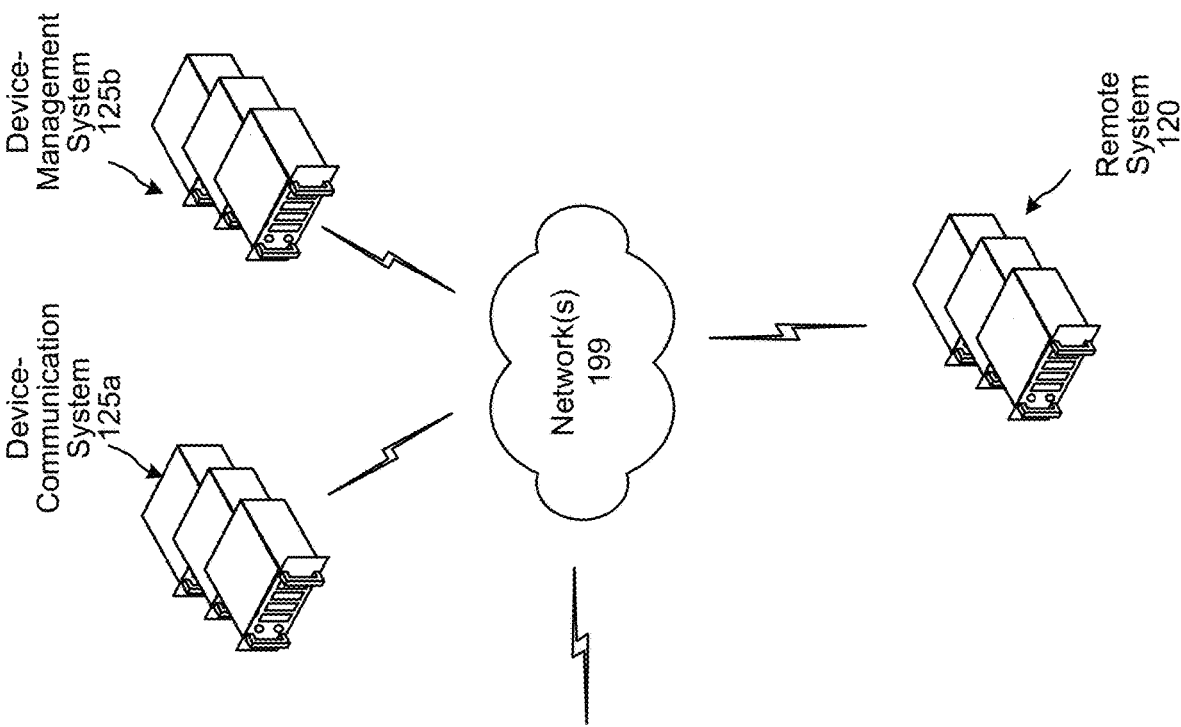
FIG. 11
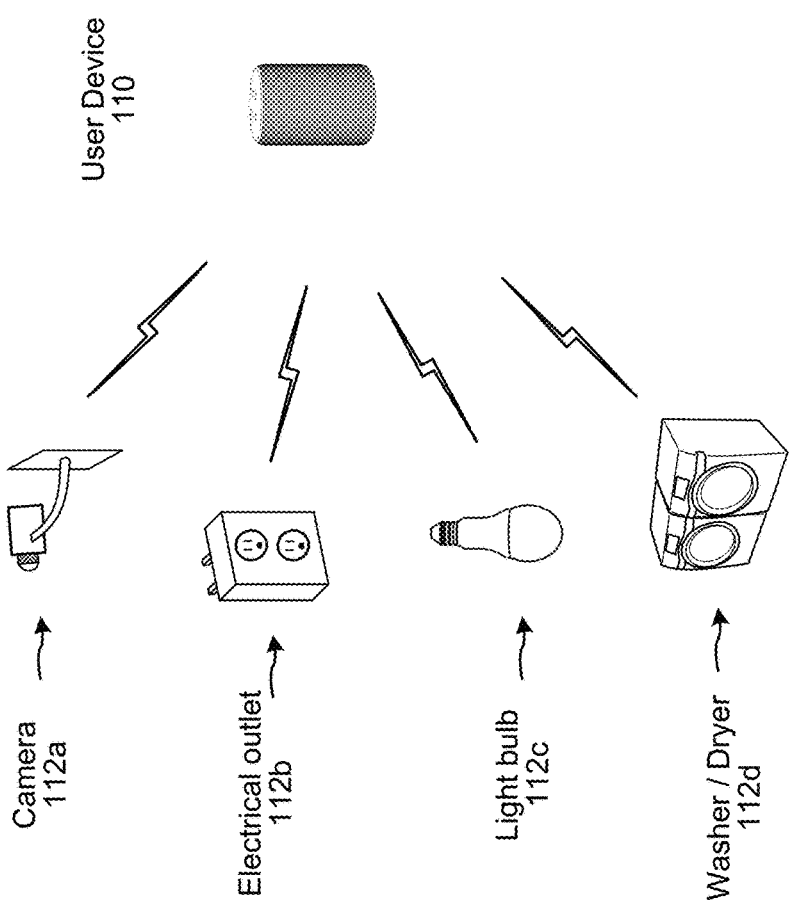

DEVICE COMMUNICATION

BACKGROUND

Computing devices may have a network interface, which may be comprised of hardware, software, and/or firmware, for communicating with other devices via a network. This network interface may be, for example, an IEEE 802.11 Wi-Fi network interface. Some computing devices, however, may not require the bandwidth and other features that a Wi-Fi network interface, or a similar network interface, provides. The manufacturers and/or maintainers of these types of computing devices may thus wish to use a different, simpler network interface to reduce the cost of manufacturing the device, to reduce the power consumption of the device, or for both reasons. These types of network interfaces may be known as device-to-device networks and may allow these devices to communicate with each other and/or with a local hub device.

BRIEF DESCRIPTION OF DRAWINGS

For a more complete understanding of the present disclosure, reference is now made to the following description taken in conjunction with the accompanying drawings.

FIGS. 1A-1D illustrate systems configured to communicate with devices according to embodiments of the present disclosure.

FIGS. 2A and 2B illustrate a user device and a device-communication system configured for communications with devices according to embodiments of the present disclosure.

FIGS. 3A-3D illustrate data flow diagrams for communicating with devices according to embodiments of the present disclosure.

FIGS. 3E and 3F illustrate data structures used for communicating with devices according to embodiments of the present disclosure.

FIGS. 4A and 4B illustrate systems for processing data from a user device according to embodiments of the present disclosure.

FIG. 11 illustrates an example of a computer network for use with a speech-processing system according to embodiments of the present disclosure.

DETAILED DESCRIPTION

Figure 1B:
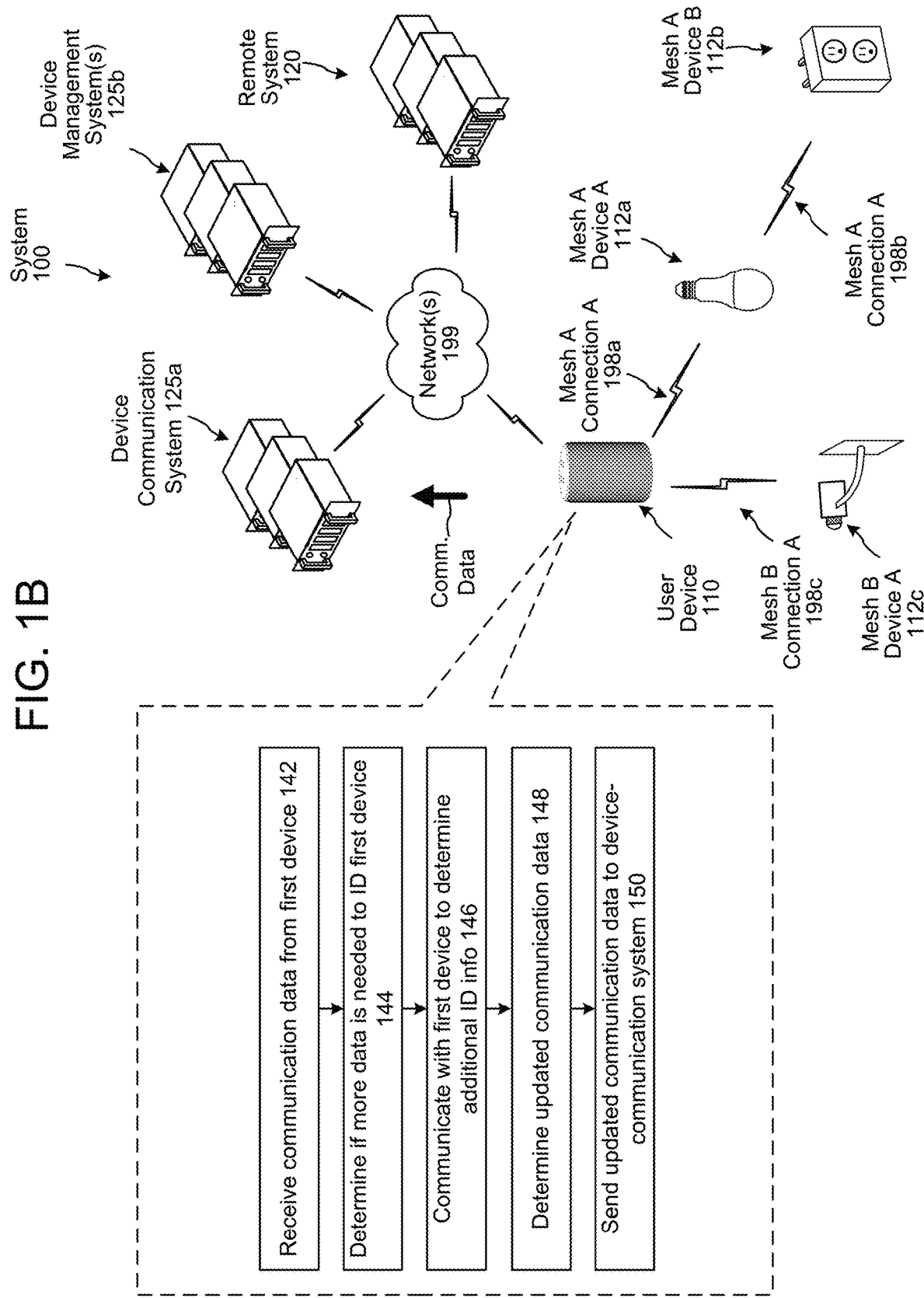

Computing devices may be used to perform a variety of tasks, such as controlling a light and/or electrical outlet in a home, factory, or other environment, capturing video of someone knocking on a front door of a home, opening and closing a garage door, and/or controlling a thermostat. In some instances, these computing devices feature a network interface, such as a Wi-Fi network interface, that is capable of communicating directly, using a first network protocol such as TCP/IP, with a corresponding remote system via a network such as the Internet. Communication with the corresponding system may provide additional features to the computing device, such as firmware updates, security patches, user customization, and/or communication with a dedicated user application.

In other instances, however, the computing device does not include such a network protocol interface capable of communication via the Internet (or other such wide-area network); it may include only, for example, a device-to-device or "mesh" network protocol interface, such as a Zigbee network interface, that is capable of communicating with one or more other similar devices also capable of communicating using the mesh network protocol. These device-to-device network interfaces may be included to reduce relative power consumption and/or manufacturing cost of the computing device. These devices may thus communicate with each other and/or a hub device that is capable of communicating via both the mesh network protocol and the first network protocol (e.g., the Internet). As the terms are used herein, a "mesh device" or "mesh-network device" refers to a computing device that includes such a device-to-device network protocol interface. A "user device" is a computing device that includes, among other things, a first network interface capable of communicating with the mesh device(s) and a second network interface capable of communicating via a network such as the Internet or other such wide-area network. The user device may further include a voice interface that allows a user to issue commands (and receive responses) by capturing speech of the user (and by outputting audio that includes a representation of synthesized speech and/or other sounds responsive to the commands).

A device management system, which may be associated with a manufacturer, maintainer, and/or developer of a mesh device may wish to communicate with it (e.g., send and receive data via the Internet) for a variety of reasons, such as upgrading its firmware to provide more or different features, to address security issues, to customize the behavior of the mesh device in accordance with user preferences, and/or to allow a user to interact with the mesh device using a dedicated application (e.g., a doorbell-camera application). To enable such communication, the device management system may be associated with a dedicated hub device specific to that mesh device; the user may configure the dedicated hub device to communicate both with that particular mesh device and with the Internet, and the device management system may communicate with the mesh device therethrough.

An environment may, however, include a number of different mesh devices, and each one may be associated with a different device management system(s) and/or use a different type of mesh network (even for the same device management system). Purchasing a dedicated hub device for each permutation of device management system and mesh network type may be prohibitively expensive; it may further be difficult to find space to place all of the different hubs and annoying and/or time-consuming to maintain them all.

A user may thus wish to configure a single (or small number) of user devices to act as the hub for the one or more device-to-device networks that provides network connectivity to the mesh device(s) to and/or from one or more device-management systems via a device communication system. Because the user device may not be manufactured, maintained, or otherwise controllable by the device communication system of the mesh device, however, the device communication system may not be able to communicate with corresponding mesh device(s) and may no longer be able to perform the aforementioned functions (e.g., provide firmware updates).

Described herein are systems and methods to allow device communication systems to communicate with corresponding mesh devices even if a user device—that is not necessarily associated with a given device communication system—is configured to communicate with the mesh network of the mesh device(s) and with a wide-area network such as the Internet. The systems and methods may further allow a device-management system to communicate with the mesh device. The device-management system may, for example, send a firmware update to the mesh device; the mesh device may, for example, sent a notification to the device-management system. In other embodiments, a user may control the mesh device using a user device by inputting a command to the user device. The command may be defined by the device-management system; the device-communication system may determine that the command is so defined, and communicate with the device-management system to receive commands for the mesh device (corresponding to a network protocol of the mesh device) and cause output of the commands thereon.

A mesh device may be (but need not necessarily be) a functionally limited device; while it may include a computer processor, computer memory, and/or storage, these components may be reduced in processing power and size with respect to other, non-functionally limited devices, such as user devices. Due to this reduction, the processing capabilities of the mesh devices are thus reduced, and these mesh devices may not be capable of processing some or all of the computer instructions necessary to accomplish a given task. The mesh devices may include devices that are constrained by their purchase price, deployment location, or intended use; examples include light bulbs and light switches that feature computer circuitry implementing a voice interface. The devices may include merely a microphone, speaker, wireless interface, and circuitry to operate them but may lack, for example, a computer memory of a size sufficient to store and run computer instructions. These mesh devices may be referred to herein as "Internet of Things" ("IoT") devices. A mesh device may, for example, assist in performing automatic speech recognition by capturing audio data and sending the audio data, via the user device, to a remote system, which may determine if the audio data includes a representation of an utterance.

FIGS. 1A-1D illustrates systems configured to provide communication between one or more mesh devices and one or more device-management systems via a user device and device-communication system, in accordance with the present disclosure. Although the figures and discussion of the present disclosure illustrate certain operational steps of the system in a particular order, the steps described may be performed in a different order (as well as certain steps removed or added) without departing from the intent of the disclosure. In various embodiments, a user device 110 such as smart speaker, a vehicle such as an automobile, or other such voice-controlled device communicates with a remote system 120 using a network 199. While FIGS. 1A-1D illustrates a smart speaker as the user device 110, the disclosure is not limited thereto, and the systems and methods described herein may be implemented using other user devices 110, such as smartphones, tablet computers, personal computers, or other devices.

Referring first to all the FIGS. 1A-1D, a device-communication system 125a (described in greater detail with reference to FIG. 4B) communicates via a first network 199, such as the Internet or other wide-area network, with a user device 110. As described below with reference to FIG. 4A, the user device may be a voice-controlled device, and may include a microphone, loudspeakers, a wakeword detector, etc. The user device 110 may, in turn, communicate with one or more mesh devices 112 via one or more mesh connections 198. For example, the user device 110 may communicate with a first mesh device 112a via a first mesh connection 198a (e.g., a Zigbee connection) and a second mesh device 112c via a second mesh connection 198c (e.g., a BLE connection). Each mesh device 112 may connect to one or more other mesh devices, such as how a first mesh device 112a connects to a third mesh device 112b via a third mesh connection 198b. The user device 110 and device-communication system 125a may provide communication between one or more device management systems 125b and the one or more mesh devices 112, as described herein. In addition, a remote system 120 may provide additional functionality, such as automatic-speech recognition (ASR), natural-language understanding (NLU), and/or text-to-speech (TTS), as described below with reference to FIG. 4A.

Figure 1C:
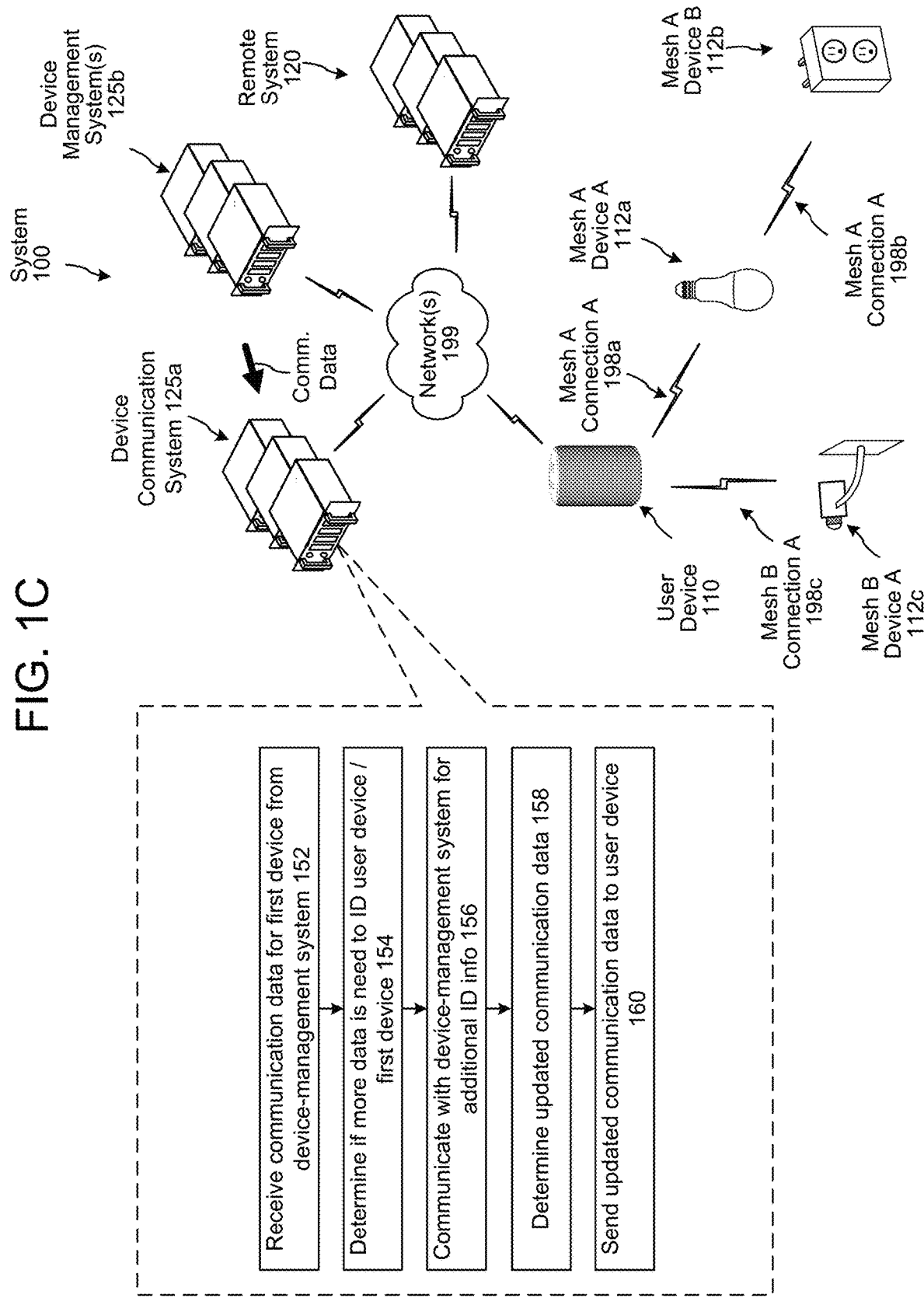

FIGS. 1A and 1B describe embodiments of the present disclosure in which a mesh device 112 communications with a device-management system 125b (for, e.g., a user command, a registration request, status update, and/or other such communication). FIGS. 1C and 1D describe embodiments of the present disclosure in which a device-management system 125b initiates communication with a mesh device 112 (for, e.g., a firmware update and/or security patch).

Referring first to FIG. 1A, the device-communication system 125a receives (130), via a first network having a first protocol, communication data corresponding to a first mesh device 112 from a user device 110. For example, the communication data may be audio data received by the user device 110 that corresponds to the mesh device 112, such as "Turn on the light." The mesh device 112 communicates with the user device 110 via a second network protocol, such as a mesh network 198 (examples of mesh networks include, as mentioned above, Zigbee and BLE networks). The device-communication system 125a determines (132) that a command represented in the first communication data corresponds to a device-management system 125b. For example, the device-management system 125b may have defined the command as corresponding to one or more commands of the second network protocol. The device-communication system 125 then sends (134) second communication data corresponding to the first communication data to the device-management system 125b.

The device-communication system 125a then receives (136) third communication data from the device-management system 125b. This first data may include header information corresponding to the first network protocol (e.g., a destination address corresponding to the destination) and one or more commands corresponding to the second network protocol. These commands correspond to the implementation of the command represented in the first communication data as implemented using the second network protocol. The device-communication system 125a then sends (138) the third data to the user device 110 and causes the user device 110 to send the portions of the third data corresponding to the second network protocol to the mesh device 112.

The device-communication system 125a may determine that a particular device-management system 125b of a plurality of device-management systems 125 is the intended recipient of the communication data received from the user device 110. The communication data may, for example, include an indication of the device-management system 125*b*, such as its name, a string of characters or numbers uniquely identifying the device-management system 125*b*, and/or other such information. The communication data may instead or in addition include indication(s) of information uniquely identifying the mesh device 112, such as its model number, serial number, media-access control ("MAC") address, and/or other such information. The communication data may instead or in addition include indication(s) of information uniquely identifying the user device 110, such as its model number, serial number, media-access control ("MAC") address, and/or other such information.

The device-communication system 125*a* may first confirm, by communicating with the selected device-management system 125*b*, that the system is indeed associated with the mesh device 112. The device-communication system 125*a* may thus send, to the device-management system 125*b*, information that includes general information about the mesh device 112, such as its make and/or model, but not information that identifies a specific mesh device 112, such as its serial number. The device-management system 125*b* may respond with confirmation of the association; only then may the device-communication system 125*a* send information to the device-management system 125*b* that identifies the mesh device 112 (e.g., its serial number).

If the mesh device 112 had previously sent communication data, the user device 110 and/or device-communication system 125*a* may store (in, e.g., computer storage) information identifying the previously determined corresponding device-management system 125*b* and may index that information using the information identifying the mesh device 112 and/or user device 110. If, however, this is the first time that the user device 110 and/or device-communication system 125*a* has received communication data from this particular mesh device 112, it may be more difficult for the device-communication system 125*a* to determine the corresponding device-management system 125*b*. The device-communication system 125*a* may, for example, send a request to the user device 110 for more information regarding the mesh device 112, such as its make and/or model number, software and/or firmware version, and/or physical and/or network location. The device-communication system 125*a* may further search available information, such as product listings, gazettes, and/or manufacturer web sites using the make, model, and/or serial number of the mesh device 112 to determine a matching device-management system 125*b*. The device-communication system 125*a* may instead or in addition determine the device-management system 125*b* based on data in a user profile associated with the user device 110. For example, the user profile may specify that all mesh devices 112, or all of a certain type of mesh device 112, associated with a user device 110 should be associated with a device-management system 125*b*.

The device-communication system 125*a* may determine a confidence score corresponding to the likelihood that a given mesh device 112 corresponds to a given device-management system 125*b*. For example, if the device-communication system 125*a* determines that a received serial number has an exact match on a website associated with a given device-management system 125*b*, the confidence score may indicate a high confidence. If the device-communication system 125*a* determines that a received serial number has a partial match on a website associated with a given device-management system 125*b*, the confidence score may indicate a medium confidence. If the device-communication system 125*a* determines that a received serial number has no match on a website associated with a given device-management system 125*b*, the confidence score may indicate a low confidence.

If the confidence score is low for each device-management system 125*b*, the device-communication system 125*a* may send, to the user device 110, audio data representing a failure to send the communication data. If the confidence score is medium for at least on device-management system 125*b*, the device-communication system 125*a* may send, to the user device 110, audio data representing a name of the determined device-management system 125*b* and a prompt to confirm sending the communication data thereto. The speech-processing techniques of the remote system 120 may assist in determining whether the user uttered an affirmative or negative reply. If affirmative, the device-communication system 125*a* may then send the communication data to the device-management system 125*b*. If negative, the device-communication system 125*a* may similarly send, to the user device 110, audio data representing a failure to send the communication data.

If only one device-management system 125*b* has a high confidence score, the device-communication system 125*a* may send the communication data thereto with no further output from the user device 110. If two or more candidate device-management systems 125*b* have high confidence scores, however, the device-communication system 125*a* may similarly cause the user device 110 to prompt the user for instructions (e.g., select between two or more candidate systems) and may similarly act in accordance with the response.

The device-communication system may receive confirmation of receipt in response. If the device-communication system 125*a* does not receive the confirmation within a certain amount of time (e.g., 1, 2, or 5 seconds), the device-communication system 125*a* may re-send the communication data and/or cause the user device 110 to output an indication of failure to deliver the communication data. If the confirmation data is received, the device-communication system 125*a* may store an association between the first device and the device-management system (in, e.g., a computer memory). This association may be used to, in the future, determine the device-management system given the first device (or vice versa).

Referring to FIG. 1B, as mentioned above, the user device 110 may also process communication data received (142) from the first mesh device 112 before sending it and/or a processed version of it) to the device-communication system 125*b*. The user device 110 may determine (144) if more data is needed for the device-communication system 125*a* to determine the appropriate device-management system 125*b*. For example, the communication data may represent a registration request; the mesh device 112 may, for example, just have been turned on for the first time and/or may have just been reset.

The communication data may include some of the information required to identify the device-management system 125*b*, but not all. For example, the user device 110 may determine that the communication data includes a serial number of the mesh device 112 but not a make or model number. Conversely, the user device 110 may determine that the communication data includes the make or model number but not the serial number. If so, the user device 110 may then communicate (146) with the mesh device 112 (e.g., send and receive messages using the mesh network 198) to determine the additional information. The user device 110 may then determine (148) updated communication data that includes the determined information and send (150) the communication data and/or updated communication data to the device-communication system 125a. If the user device 110 failed to determine some items of information (e.g., the make, model, and/or serial numbers), the user device 110 may also send an indication of this failure to the device-communication system 125a.

Referring to FIGS. 1C and 1D, as mentioned above, the device-management system 125b may be the source of the communication data to be sent to the mesh device 112. Referring first to FIG. 1C, the device-communication system 125a may receive (152) communication data intended for a first mesh device 112 from a device-management system 125b. As mentioned above, if the device-communication system 125a had previously received communication data from that device-management system 125b intended for that mesh device 112, it may have stored, in a computer memory, the results of that previous determination. The device-communication system 125a may then index the computer storage using information in the communication data, such as the make, model, and/or serial number of the mesh device 112, to determine to which user device 110 to forward the communication data. If the device-communication system 125a determines (154) that the communication data does not, however, include this information, the device-communication system 125a may communicate (156) with the device-management system 125b to determine this additional information, if any.

The device-communication system 125a may then determine (158) updated communication data; this updated communication data may, for example, include a translated address or name identifying the particular mesh device 112. For example, the device-management system 125b may identify the mesh device 112 by its serial number, while the user device 110 may identify the mesh device 112 by another name, such as "Bob's Doorbell." The updated communication data 158 may thus include this other name instead of or in addition to the serial number. The device-communication system 125a may then send (160) the updated communication information to the user device 110 for further processing (as described below with reference to FIG. 1D).

Referring to FIG. 1D, the user device 110 may first receive (162) communication data from the device-communication system 125a intended for the first mesh device 112. If the user device 110 is connected to only a single mesh network, the user device may simply send the communication data over the network without further processing. If, however, the user device 110 is connected to more than one mesh network, the user device 110 may first determine to which mesh network the mesh device 112 belongs.

The user device 110 may then determine (164) if more data is needed to identify the mesh device 112 and/or corresponding mesh network. The received communication data may, for example, indicate to which mesh network the mesh device 112 belongs. Alternatively, the user device 110 may have previously determined to which mesh network the mesh device 112 belongs and stored that determination in a computer storage. The user device 110 may then index the computer storage with information identifying the mesh device 112 in the communication data (e.g., a serial number) to determine the mesh network. If such information is not available in the communication data, the user device may communicate (166) with the device-communication system 125a to determine the information.

The user device may then determine (168) updated communication information that includes the determined information and/or formatting suitable for the mesh network. The user device may then send (170) the communication data to the determined mesh device 112 via the determined mesh network.

FIGS. 2A and 2B illustrate a user device and a device-communication system configured for communications with devices according to embodiments of the present disclosure. Referring first to FIG. 2A, as mentioned above, the user device 110 may be connected to one or more different mesh networks. Each mesh network may be of a same or different type. The present disclosure is further not limited to use of only a single user device 110; a home may include, for example, multiple user devices 110 that all share the same Wi-Fi network. A first user device 110 may be connected to a first mesh network, while a second user device 110 (in communication via the Wi-Fi network with the first user device 110) may be connected to a second mesh network.

As illustrated, a first mesh network A 202 includes M mesh devices 112, where M is three or more. Two mesh devices 112Aa and 112Ab, may be light bulbs, while an Mth mesh device 112Am may be a camera. A second mesh network B 204 may include only to mesh devices, a light bulb 112Ba and an electrical outlet 112Bb. A third mesh network N includes only a single device, a washer/dryer 112Na. The present disclosure is not limited to any particular number of mesh networks, and particular number of devices in each network, or to any particular number of user devices 110.

FIG. 2B illustrates a device-communication system 125a in communication via a network 119 with at least one user device 110 and at least one remote system 120. Any number of device-management system 125b may also be connected to the network 199. When the device-communication system 125a receives communication data that originated from a mesh device 112, it determines, as described above, which of the device management systems should receive it.

FIGS. 3A-3D illustrate data flow diagrams for communicating with devices according to embodiments of the present disclosure. FIG. 3A corresponds to the disclosure of FIG. 1A, FIG. 3B corresponds to the disclosure of FIG. 1B, and so forth. Turning first to FIG. 3A, the user device receives (302) communication data 304 from a mesh device 112 and sends it (and/or possibly a processed version of it, in accordance with FIGS. 1B/3B) to the device-communication system 125a. The device-communication system 125a processes (306) the communication data to determine information about the mesh device 112 and/or user device 110, such as the device ID (e.g., serial number) and/or device-management system associated with the mesh device. As described with reference to FIG. 1A, this processing may include communication with the user device 110 and/or other sources, such as a gazette, to determine this information.

Based on this determined information, the device-communication system 125a determines (308) which of a plurality of device-management systems 125b correspond to the mesh device 112, again as described in greater detail with reference to FIG. 1A. The device-communication system 125a then sends communication data 310 (and/or a processed version thereof) to the determined device-management system 125b, which may process (312) the communication data in accordance with any commands and/or status data described therein. As described above, if the communication data includes an API command defined by the device-management system 125b, the device-management system 125b may determine second communication data 314 that includes one or more mesh-network commands that correspond to the API command. The device-communication system 125*a* may further receive data representing a confirmation of receipt from the device-management system 125*b*. The device-communication system 125 may receive the second communication data 314 from the device-management system 125*b* and may then send corresponding second communication data 316 to the user device 110 for further processing (e.g., sending to the mesh device 112).

In some embodiments, the device-communication system 125*a* may determine that more than one device-management system 125*b* should receive the communication data 310. The device-communication system 125*a* may then send, to the one or more additional device-management system 125*b*, the communication data 310 and may similarly receive confirmations of receipt 314 therefrom. In some embodiments, the device-communication system 125*a* determines the more than one device-management systems 125*b* as described above with reference to step 308 and sends the communication data 310 to each system. In other embodiments, the device-communication system 125*a* sends the communication data 310 to only a subset of the determined device-management system 125*b*. If, for example, the communication data 310 represents a device-registration request, the device-communication system 125 may send the communication data 310 to each device-management system 125*b*. If, on the other hand, the communication data 310 is relevant to only the subset, the device-communication system 125*a* sends the communication data 310 to only that subset. The device-communication system 125*a* may determine the relevance based at least in part on determining that the communication data 310 includes private or secure information that corresponds to only device-management systems 125*b* in the subset.

The device-communication system 125*a* may send the communication data to the one or more device-management system(s) 125*b* via an event bus. The device-communication system 125*a* and each of the device-management system(s) 125*b* may be connected to the event bus via a network, such as the network 199. When one system sends communication data to the event bus, the event bus may send the data to the other systems connected to the event bus. The event bus may thus comprise hardware and/or software capable of temporarily storing the communication data, such as a buffer or queue, and storage that includes network addresses of the system(s) 125 and to which systems the communication data should be sent, given a source system of the communication data.

Referring to FIG. 3B, the mesh device 112 may determine (320) to communicate with a device-management system 125*b*. This determination may be based on, as described with reference to FIG. 1B, a registration request, a device status, and/or an event (such as, for example, a doorbell ringing). The user device 110 receives communication data 322 from the mesh device 112. If the user device determines (324) that the device-communication system 125*a* can identify the corresponding device-management system 125*b* from the communication data 322 (e.g., the communication data identifies the make, model, and/or serial number of the mesh device 112), the user device 110 may forward the communication data 322 to the device-communication system 125*b* as communication data 326. If the communication data 322 does not include this information, but if the user device 110 can determine it (e.g., information from previously sent communication data included it, and the user device 110 stored it in a computer memory), the user device 110 may process the communication data 322 to include this information in the communication data 326.

If, however, the communication data 322 does not include this information, and if the user device 110 cannot determine it from previously sent communication data, the user device 110 may send a request 328 for the additional information to the mesh device 112. The mesh device 112 may determine (330) the additional information (by, for example, looking it up in a computer memory and/or firmware of the mesh device 112) and send the additional information 322 to the user device 110. The user device 110 may then determine (334) updated communication data 336 that includes the additional information and send the updated communication data 336 to the device-communication system 125*a*.

Referring to FIG. 3C, the device-management system 125*b* may determine (340) to communicate with a given mesh device 112. This determination may be reached due to, for example, a firmware update or security patch for the mesh device 112. In other embodiments, this determination is reached via input from a user application that wishes to communicate with the mesh device 112 given user input. For example, the user may have installed a doorbell camera application that, when the user wishes to view the camera, sends a request to view to the corresponding device-management system 125*b*.

The present disclosure is not limited to the device-management system 125*b* communicating with a single mesh device 112, and the device-management system may send communication data 342 to any number of mesh devices 112. For example, the device-management system 125*b* may send a security patch to every mesh device 112 of a certain type. In some embodiments, the device-management system 125*b* may send communication data 342 to every mesh device of a certain type located in a certain area, for example North America.

The device-communication system 125*a* receives the communication data 342 and determines (344) a corresponding user device 110 (or user devices 110). If the device-communication system 125*a* can determine (346) the identity of the user device(s) 110 using the communication data 342, it sends the communication data (and/or a processed version thereof) to the appropriate user device(s) 110. If not, the device-communication system 125*a* may send a request (348) for additional information back to the device-management system 125*b*, which may respond with updated communication data 350 that may include the additional information (and/or the original communication data 342). The device-communication system 125*a* may then send corresponding communication data 352 to the determined user device 110.

The device-communication system 125*a* may determine the user device 110 by selecting one of a plurality of user devices 110 associated with the mesh device 112. As described above, the mesh network of the mesh device 112 may be connected to more than one user device 110. The determined user device 110 may be the one that initially received communication data from the mesh device, the one that last received communication data from the mesh device, or the one that received the most communication data from the mesh device. The device-communication system 125*a* may further select the user device 110 based on the transmission data 382, as described above, to select the user device 110 having the shortest distance (e.g., fewest number of hops) between it and the mesh device 112.

The device-communication system 125*a* may further determine that a given user device 110 is not able to send data to a given mesh device 112. The user device 110 may, for example, be inoperative because it experienced a hardware or software failure or because it is temporarily or permanently powered off. The device-communication system 125a may therefore select a user device 110 previously determined to be in communication with the mesh device 112. Alternatively or in addition, the device-communication system 125a may determine a user profile associated with the user device 110 (as represented in, for example, profile storage 470) and select a second user device 110 associated with the user profile. In some embodiments, the device-communication system 125a determines more than one user device 110 potentially in communication with the mesh device 112 and sends the communication data to the determined user devices 110. The mesh device 112 may therefore receive more than one copy of the communication data; the mesh device 112 may therefore be configured to delete and/or disregard additional copies of the communication data. The communication data may, for example, include a unique identifier, and the mesh device 112 may be configured to delete and/or disregard any further copies of the communication data that include that same identifier.

Referring to FIG. 3D, as mentioned above with respect to FIG. 3C, the user device 110 receives communication data 354 from the device-communication system 125a. The user device 110 determines (356) the appropriate mesh network for the communication data 354 and/or how to address the mesh device 112 on the mesh network. If it can so determine (358), it sends corresponding communication data 360 to the mesh device 112. If not, the user device 110 sends a request (362) for additional information to the device-communication system 125a, which returns updated communication data 362 that includes the additional information. The user device 110 then sends updated communication data 366 to the mesh device 112 on the determined mesh network. The mesh device 112 may process (368) the communication data 368. Before, after, or during the processing, the mesh device 112 may send receipt data 370 indicating receipt of the communication data 366 to the user device 110, which may send corresponding receipt data 372 to the device-communication system 125a.

With reference to FIGS. 3A-3D, when either the user device 110 and/or the device-communication system 125a ceases processing a particular item of communication data (e.g., it receives confirmation of receipt of the communication data and/or processed version thereof), it may delete its copy of both the communication data as received and any processed version of the communication data it generated. The user device 110 and/or the device-communication system 125a may further delete any metadata associated with the communication data, such as indication of receipt, time/date of receipt, data size, or other such metadata. At least a portion of the communication data may be encrypted by either the mesh device 112 and/or the device-management system 125b; the user device 110 and/or device-communication device 125a may not have the security keys or other such means to decrypt the communication data. Information identifying the mesh device 112 and/or device-management system 125b may not be encrypted to allow the user device 110 and/or device-communication system 125a to properly route the communication data.

Figure 3E:
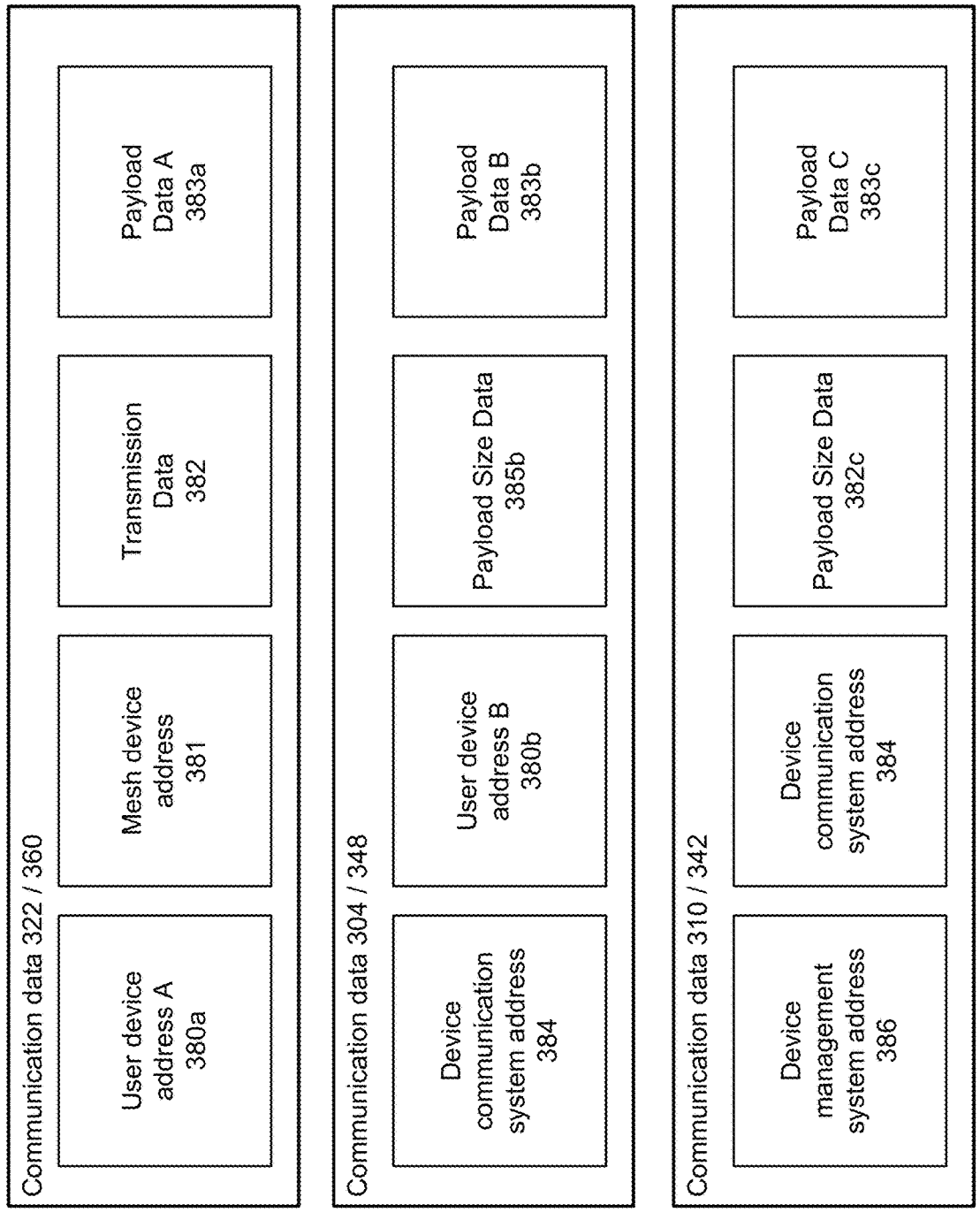

FIG. 3E illustrates examples of the various communication data 304, 310, 322, 342, 348, 360 described above. Communication data 322, 360 may, for example, be exchanged between the user device 110 and one or more mesh devices 112. The communication data 322, 360 may include data representing a first address 308a of the user device 110 on a mesh network 198 and data representing a second address 381 of the mesh device 112. When the mesh device 112 sends data to the user device 110, the first address 380a may represent the destination and the second address 381 may represent the source; when the user device 110 sends data to the mesh device 1112, the first address 380a may represent the source and the second address 381 may represent the destination.

The addresses may be binary numbers that uniquely identify each device on the mesh network 198, for example an 8-, 16-, or 32-bit number. The user device 110 may determine an address for each mesh device 112 and transmit the address thereto. This transmission may include further information identifying the mesh device 112, such as its serial number. In some embodiments, the address is or includes the serial number.

As described herein, a given mesh device 112 may not be directly connected to the user device 110, and the communication data 322, 360 may pass through one or more other mesh devices during its journey from the mesh device 112 to the user device 110. Each mesh device 112, upon receipt of the communication data 322, 360, may process the destination address and compare it to its own address. If the addresses match, the mesh device 112 may process one or more items of payload data 383a. The payload data 383a may include a number of bytes of data, for example, 512 or 1024 bytes. If the addresses do not match, the mesh device 112 may forward the data 322, 360 to one or more other connected mesh devices 112 and/or the user device 110. After determining that the addresses do not match, the mesh device may create and/or update transmission data 382 to indicate the forwarding of the data 322, 360. The transmission data 382 may, for example, include a running tally of how many mesh devices 112 exist on the mesh network between the user device 110 and the mesh device 112 associated with the source or destination address (e.g., the number of "hops" between the user device 110 and a mesh device 112.

In various embodiments, a given mesh device 112 may communicate with a first user device 110a and a second user device 110b. Each user device 110 may determine the number of hops between itself and the given mesh device, as described above. The first and/or second user device 110a, 110b may transmit this information to the device-communication system 125a. The device-communication system 125 may select the user device 110a, 110b associated with fewer hops for communication with the given mesh device 112.

The user device 110 may also communicate with the device-communication system 125a using communication data 304, 348. This data may similarly include a source address (which may be the address 384 of the device-communication system 125a or the address 380b of the user device 110) and a destination address (which may be other of the address 384 of the device-communication system 125a and the address 380b of the user device 110). The address 380b of the user device 110 may differ from that of the address 380a of the user device 110. E.g., the address 380a may be a mesh-network address, while the address 380b may be an Internet (e.g., TCP/IP) address. The communication data 304, 348 may include payload data 383b, which may be or include the payload data 383a. In some embodiments, for example, the payload data 383b may be in a different format than that of the payload data 383a, such as having a different word size and/or endian type. The payload data 383b may further vary in size; this size may be represented by payload size data 385b.

The device-communication system 125a may also communicate with the device-management system 125b using communication data 310, 342. This data may similarly include a source address (which may be the address 384 of the device-communication system 125a or the address 3886 of the device-management system 125b) and a destination address (which may be the other of the address 384 of the device-communication system 125a and the address 3886 of the device-management system 125b). The address 384 of the device-communication system 125b may be the same as that of the communication data 304, 348. The communication data 310, 342 may include payload data 383c, which may be or include the payload data 383b.

FIG. 3F illustrates how, in some embodiments, the device communication system 125a may send data corresponding to the second network protocol to the mesh device 112 using the first network protocol. The device communication system 125a may send and/or receive, to/from the user device 110, communication data 395 that includes header information 396 corresponding to the first network protocol. This header information 396 may include a network address of the user device 110 (for communication data 395 sent from the device communication system 125a to the user device 110) or a network address of the device communication system 125a (for communication data 395 sent from the user device The user device 110 may translate the communication data 295 of the first network protocol to communication data 390 of the second network protocol. For example, a first item of communication data 390a may include second network protocol header information 391 identifying the mesh device 112 and a first item of data 392a corresponding to the second network protocol, as included in the communication data 395. The user device 110 may thus allow the device communication system 125 and/or the device management system 125b to send data corresponding to the second network protocol to the mesh device 112.

Figure 4A:
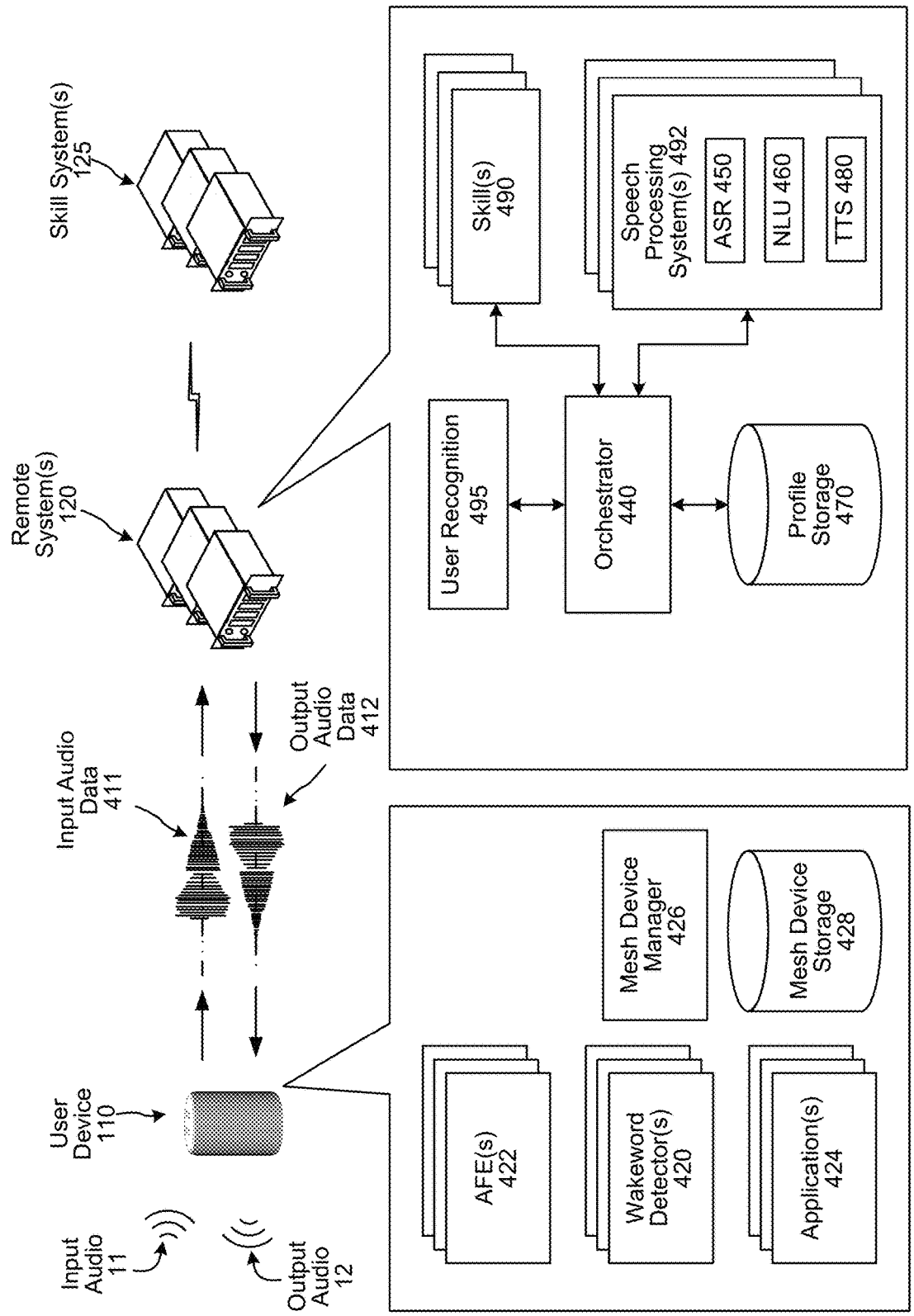

FIGS. 4A and 4B illustrate further details of the user device 110, remote system 120, and device-communication system 125a in accordance with embodiments of the present disclosure. Referring first to FIG. 4A, the user device 110 may include speech-processing components such as an acoustic front end ("AFE") 422 and a wakeword detector 420; the remote system may include ASR 450, NLU 460, and/or TTS 480 components. The user device 110 may further include a mesh device manager 426 for sending and receiving the communication data to and from the mesh device 112, as described herein, as well as mesh device storage 428 for storing information about one or more mesh devices 112, such as pairing serial numbers of mesh devices 112 with particular mesh networks and positions on said networks.

The speech-processing techniques described herein may allow a user to interact with one or more mesh devices 112. For example, if the wakeword is "Alexa," the user may check for updates for a particular mesh device 112 by saying, "Alexa, is my doorbell cam software up to date?" The device-communication system 125a may then communicate with the appropriate device-management system 125b as described herein. As another example, if the device-communication system 125a cannot determine which of two device-management systems 125b should receive communication data from a mesh device 112, the remote system 120 may cause the user device 110 to output audio of the synthesized speech, "Do you want Manager A or Manager B?" The remote system 120 may then process the user's response and select a device-management system 125b accordingly.

Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Natural-language generation (NLG) is a field of computer science, artificial intelligence, and linguistics that relates to enabling computers to generate output text data responsive to input text data, such as a response to a command. Text-to-speech (TTS) is a field of computer science, artificial intelligence, and linguistics that relates to enabling computers to convert a representation of text into audio representing synthesized speech. ASR, NLU, NLG, and/or TTS may be used together as part of a natural-understanding system, which may also be referred to as a speech-processing system.

A voice-controlled user device 110 and/or a remote system 120 may be configured to receive a spoken user input and detect a wakeword and/or other text in the user input; determine a command in the user input; and provide a response to the command. A user may thus interact with the voice-controlled user device, another user device, and/or remote system by voice. In some embodiments, in response to the user device detecting the wakeword, the user device may send audio data, representing the speech of the user, to the remote system for further processing. The remote system may further process the audio data to verify that it includes a representation of the wakeword and/or to determine the command and/or response. The user device may then receive, from the remote device, output audio, video, or other data related to the response and/or other data required to perform an action associated with the response (e.g., a command to turn on a light).

The user device 110 may include one or more wakeword detector(s) 420 that process the frames of audio data to determine if a wakeword is represented therein. The input audio data 411 may include a representation of the wakeword and/or a representation of other words than include the command. The user device 110 may determine additional data, such as a time of detection of the wakeword and/or an indication of which wakeword was detected. The user device 110 may thus first determine that the audio data includes a first representation of a first wakeword corresponding to a first speech-processing system.

The various components illustrated in FIG. 4A may be located on same or different physical devices. For example, as shown in FIG. 4A, some components may be disposed on the user device 110, while other components may be disposed on the remote system 120. However, some or all of the components may be disposed on the user device 110. Communication between various components may thus occur directly (via, e.g., a bus connection) and/or across a network(s) 199. As described in greater detail herein, the user device 110 may include an acoustic front end (AFE) 422 for processing audio, one or more wakeword detectors 420 for detecting one or more wakewords, and/or one or more applications 424 for providing output and/or changing a state of the user device 110, such as illuminating a light. As illustrated, the wakeword detector 420 is disposed on the user device 110, while further speech-processing components (such as the NLU component 460) are disposed on the remote system 120. The present disclosure is not, however, limited to only this arrangement of components, and any other disposition of components is within the embodiments of the present disclosure. For example, some or all of the speech processing may be performed by the user device 110, and the user device 110 may thus not send any audio data 411 to the remote system 120.

An audio capture component(s), such as a microphone or array of microphones of the user device 110, captures input audio 11 and creates corresponding microphone data. The AFE 422 may process the microphone data using a number of techniques, such as determining frequency-domain audio data by using a transform such as an FFT, performing AEC and/or ANR, and/or by performing beamforming. The output of the AFE 422 may be, or include a representation of, the input audio data 411.

The user device 110 may process the input audio data 411 to determine whether speech is represented therein. The user device 110 may use various techniques to determine whether the input audio data 411 includes speech. In some examples, a voice-activity detector of the user device 110 may apply voice-activity detection (VAD) techniques. Such VAD techniques may determine whether speech is present in audio data based on various quantitative aspects of the input audio data 411, such as the spectral slope between one or more frames of the audio data; the energy levels of the audio data in one or more spectral bands; the signal-to-noise ratios of the audio data in one or more spectral bands; or other quantitative aspects. In other examples, the user device 110 may include a classifier configured to distinguish speech from background noise. The classifier may be implemented by techniques such as linear classifiers, support vector machines, and decision trees. In still other examples, the user device user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 420 may determine that the input audio data 411 contains a representation of a first wakeword and a second wakeword (as described in greater detail below); the user device 110 may thereafter send the input audio data 411 to the system(s) 120. As described above, an example wakeword is "Alexa." The user device 110 may include one or more wakeword detector(s) 420 that recognize multiple wakewords and/or wakeword detector(s) 420 that each recognize a single wakeword. The wakeword detector 420 may be configured to recognize different wakewords, such as "Computer" instead of "Alexa," upon receipt of an input.

The wakeword detector(s) 420 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 420 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a first wakeword is detected by the wakeword detector(s) 420, the user device 110 may begin transmitting the audio data 411 to the remote system(s) 120. The input audio data 411 may include data corresponding to the wakeword; in other embodiments, the portion of the audio corresponding to the wakeword is removed by the user device 110 prior to sending the input audio data 411 to the remote system(s) 120. In the case of touch input detection, for example, the input audio data 411 may not include a wakeword.

In various embodiments, the wakeword detector(s) 420 may use one of a plurality of wakeword-detection models. Each model may be trained to detect a different wakeword. In some embodiments, a single model may detect multiple wakewords. Each wakeword may be associated with a different speech-processing system. Upon detection of a particular wakeword, the user device 110 may send the audio data 411 (and/or an indication of detection of the wakeword) to its corresponding speech-processing system.

In various embodiments, the wakeword-detection model of the wakeword detector(s) 420 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 420 may determine a similarity score for the candidate wakeword based on how similar it is to the stored wakeword; if the similarly score is higher than the wakeword-detection threshold, the wakeword detector 420 determines that the wakeword is present in the audio data, and if the similarity score is less than the wakeword-detection threshold, the wakeword detector 420 determines that the wakeword not is present in the audio data. For example, if the candidate wakeword matches the stored wakeword very closely, the wakeword detector 420 may determine a similarity score of 100; if the candidate wakeword does not match the stored wakeword at all, the wakeword detector 420 may determine a similarity score of 0. If the wakeword detector 420 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Upon receipt by the remote system(s) 120 and/or upon determination by the user device 110, the input audio data 411 may be sent to an orchestrator component 440. The orchestrator component 440 may include memory and logic that enables it to transmit various pieces and forms of data to various components of the system, as well as perform other operations as described herein. The orchestrator component 440 may be or include a speech-processing system manager and/or one or more of the speech-processing systems 492, which may be used to determine which, if any, of the ASR 450, NLU 460, and/or TTS 480 components should receive and/or process the audio data 411. In some embodiments, the orchestrator component 440 includes one or more ASR components 450, NLU components 460, TTS components 480, and/or other processing components, and processes the input audio data 411 before sending it and/or other data to one or more speech-processing components 492 for further processing. In other embodiments, the orchestrator component 440 sends the input audio data 411 to one or more of the speech-processing components 492 for processing.

In some embodiments, the orchestrator 440 and/or speech-processing system manager communicate with the speech-processing systems 492 using an application programming interface (API). The API may be used to send and/or receive data, commands, or other information to and/or from the speech-processing systems 492. For example, the orchestrator 440 may send, via the API, the input audio data 411 to a speech-processing systems elected by the speech-processing system manager and may receive, from the selected speech-processing system 492, a command and/or data responsive to the audio data 411.

Each speech-processing system 492 may include an ASR component 450, which may transcribe the input audio data 411 into text data. The text data output by the ASR component 450 may represent one or more than one (e.g., in the form of an N-best list) ASR hypotheses representing speech represented in the input audio data 411. The ASR component 450 may interpret the speech in the input audio data 411 based on a similarity between the audio data 411 and pre-established language models. For example, the ASR component 450 may compare the input audio data 411 with models for sounds (e.g., acoustic units such as phonemes, senons, phones, etc.) and sequences of sounds to identify words that match the sequence of sounds of the speech represented in the input audio data 411. The ASR component 450 sends the text data generated thereby to an NLU component 460, via, in some embodiments, the orchestrator component 440. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein.

The first speech-processing system 492a may control, have access to, or otherwise be associated with a first set of skills 490, applications, and/or speech styles, and the second speech-processing system 492b may control, have access to, or otherwise be associated with a second set of skills 490, applications, and/or speech styles. One such skill 490 may be the device-communication system 125a; other skills 490 may be the device-management system(s) 125b. In other embodiments, however, the device-communication system 125a and/or the device-management system(s) 125b are standalone systems akin to the remote device 120; the present disclosure is not limited to any particular type or arrangement for the device-communication system 125a and/or the device-management system(s) 125b.

Figure 5:
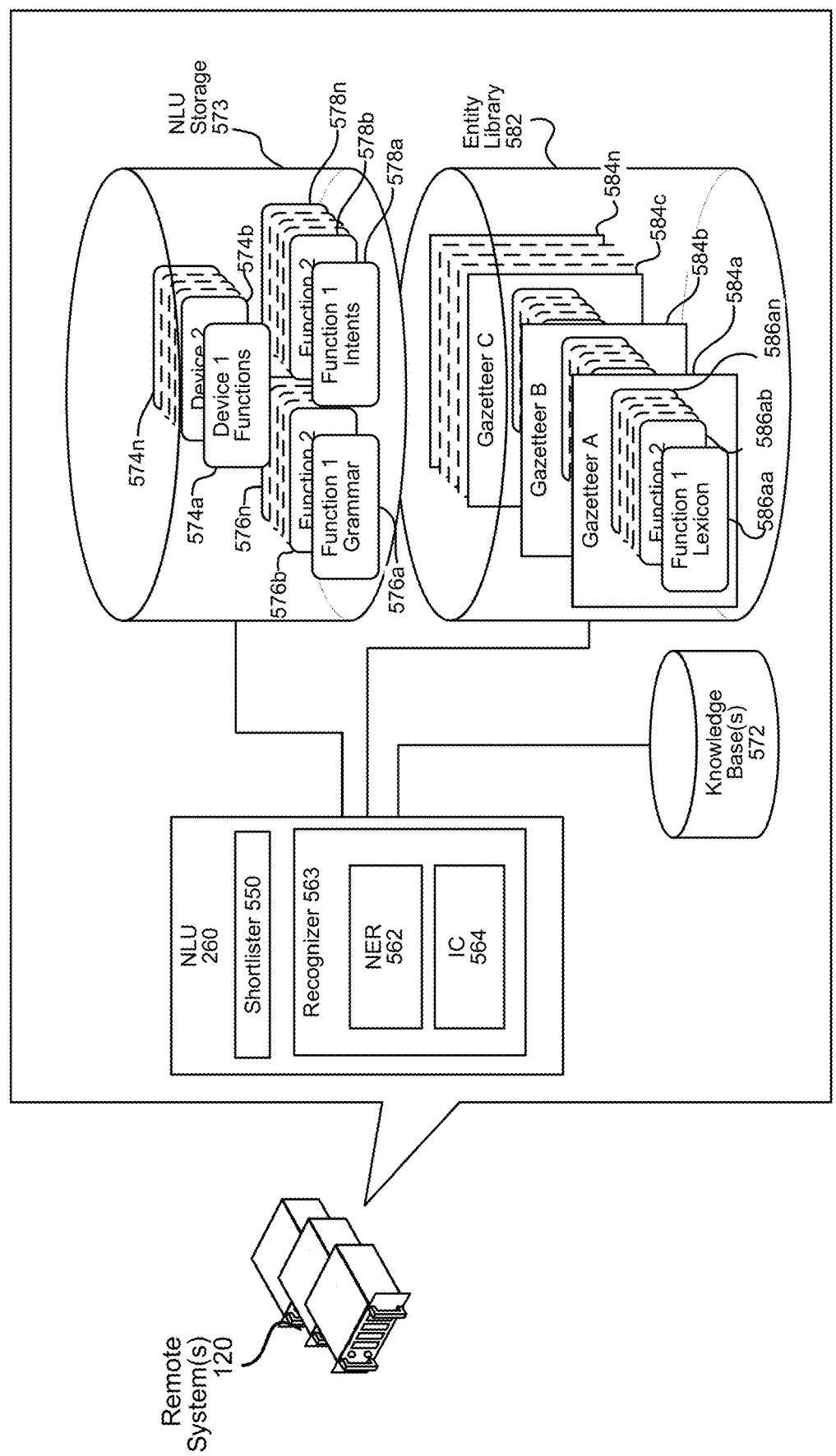
FIG. 5 illustrates a natural-language processing system according to embodiments of the present disclosure.
Figure 6:
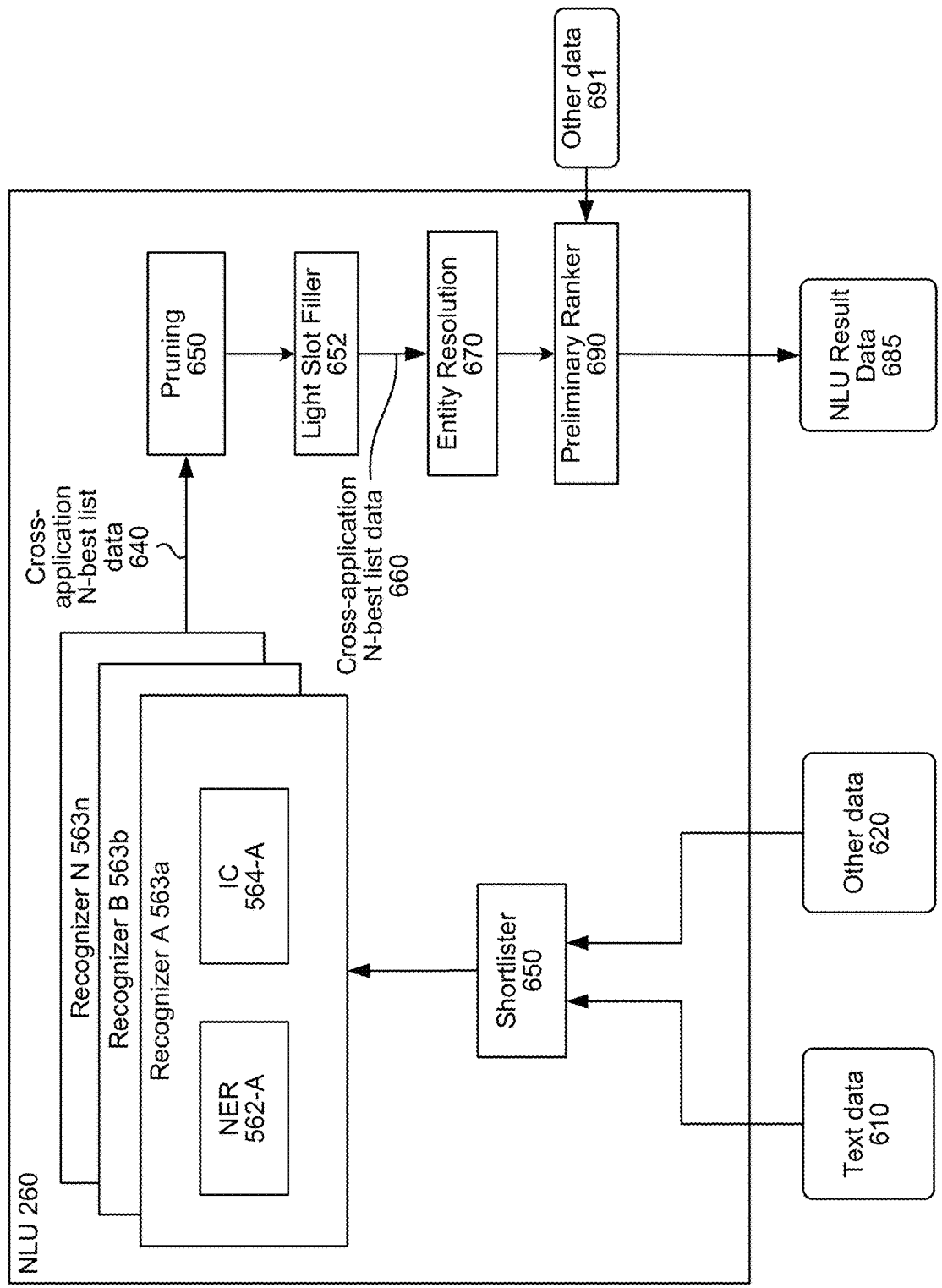
FIG. 6 illustrates components of a natural-language processing system according to embodiments of the present disclosure.

Each speech-processing system 492 may further include a NLU component 460, which is shown in greater detail in FIGS. 5 and 6, that attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the user device 110, the system(s) 120, a skill component 490, a skill system(s) 125, etc.) to execute the intent. For example, if the text data corresponds to "turn off the lights," the NLU component 460 may determine an intent that the system 120 and device-communication system 125a turn off lights associated with the user device 110 and connected mesh devices 112.

The NLU results data may be sent (via, for example, the orchestrator component 440) from the NLU component 460 (which may include tagged text data, indicators of intent, etc.) to a skill component(s) 490. If the NLU results data includes a single NLU hypothesis, the NLU component 460 may send the NLU results data to the skill component(s) 490 associated with the NLU hypothesis. If the NLU results data includes an N-best list of NLU hypotheses, the NLU component 460 may send the top scoring NLU hypothesis to a skill component(s) 490 associated with the top scoring NLU hypothesis. As described above, the NLU component 460 and/or skill component 490 may determine, using the interaction score, text data representing an indication of a handoff from one speech-processing system 492 to another.

A skill component 490 may be software running on the system(s) 120 that is, or is similar to, a software application. A skill component 490 may enable the system(s) 120 to execute specific functionality in order to provide data or produce some other requested output. The system(s) 120 may be configured with more than one skill component 490. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 490 may operate in conjunction between the system(s) 120 and other devices, such as the user device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill system(s) 125 may communicate with a skill component(s) 490 within the system(s) 120 directly and/or via the orchestrator component 440. A skill system(s) 125 may be configured to perform one or more actions. A skill may enable a skill system(s) 125 to execute specific functionality in order to provide data or perform some other action requested by a user. For example, a weather service skill may enable a skill service(s) 125 to provide weather information to the system(s) 120, a car service skill may enable a skill system(s) 125 to book a trip with respect to a taxi or ride sharing service, an order pizza skill may enable a skill system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system(s) 120 may include a skill component 490 dedicated to interacting with the skill system(s) 125. A skill, skill device, or skill component may include a skill component 490 operated by the system(s) 120 and/or skill operated by the skill system(s) 125.

Figure 7:
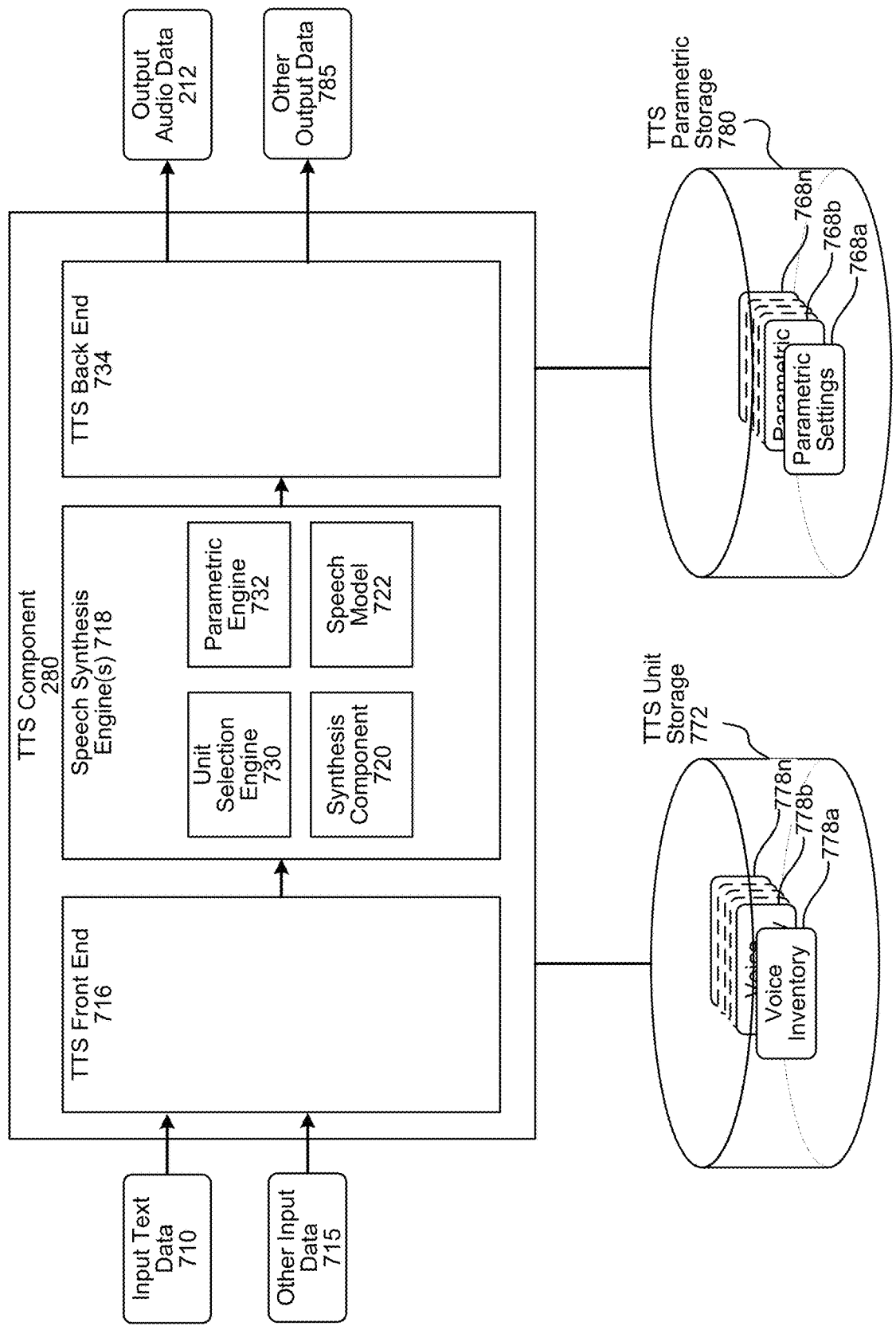
FIG. 7 illustrates text-to-speech processing components according to embodiments of the present disclosure.

The speech-processing system 492 may include a TTS component 480, which is shown in greater detail in FIG. 7, that generates audio data (e.g., synthesized speech) from text data using one or more different methods. Text data input to the TTS component 480 may come from a skill component 490, the orchestrator component 440, and/or another component of the system. The text data may include an indication of a speech-processing component and/or data responsive to a command.

Figure 8:
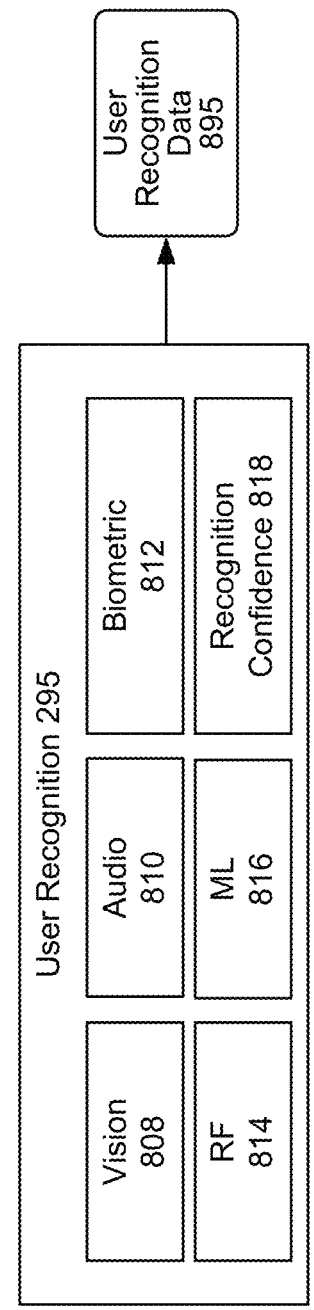
FIG. 8 illustrates a user-recognition component according to embodiments of the present disclosure.

The system(s) 120 may include a user-recognition component 495, which is shown in greater detail in FIG. 8, that recognizes one or more users associated with data input to the system. The user-recognition component 495 may take as input the audio data 411 and/or text data output by the ASR component 450. The user-recognition component 495 may perform user recognition by comparing audio characteristics in the input audio data 411 to stored audio characteristics of users. The user-recognition component 495 may also perform user recognition by comparing biometric data (e.g., fingerprint data, iris data, etc.), received by the system in correlation with the present user input, to stored biometric data of users. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The remote system(s) 120 may include profile storage 470. The profile storage 470 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a user device 110, the user profile (associated with the presented login information) may be updated to include information about the user device 110. As described, the profile storage 470 may further include data that shows an interaction history of a user, including commands and times of receipt of commands. The profile storage 470 may further include data that shows when a second user was present to hear an indication of a handoff for a command uttered by a first user.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 120 may be configured to incorporate user permissions and may only perform activities disclosed herein if approved by a user. As described above, these permissions may include a grant (or denial) to use a particular speech-processing system 492. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The audio data may then send the audio data to the selected speech-processing system 492. In some embodiments, the user device 110 further includes one or more applications 424 associated with one or more speech-processing systems 492. For example, a first application 424a may be associated with a first speech-processing system 492a, a second application 424b may be associated with a second speech-processing system 492a, and so on. An application 424 may be associated with more than one speech-processing system 492. In various embodiments, an application 424 receives, from the speech-processing system determination component 226, data identifying one or more speech-processing systems 492 and sends the audio data to the identified speech-processing system 492.

FIG. 4B illustrates components of the device-communication system 125a in accordance with the present disclosure. As described above, the device-communication system 125a may receive communication data 413 from the user device 110 that originated at a mesh device 112, and may provide communication data 414 to the user device 110 ultimately intended for a mesh device 112.

A device-management system manager component 430 may select one of a plurality of device-management systems 125b for receipt of communication data originating at a mesh device 112, as described herein. The device-management system manager component 430 may further receive communication data from a device-management system 125*b* intended for a mesh device 112 and may further communicate with the device-management system 125*b* (before sending the communication data to the user device 110) to determine the identity of the user device 110 and/or mesh device 112.

A device-management system storage 434 may be used to store associations between information identifying a mesh device 112 (e.g., a serial number) and a particular device-management system 125*b*. When subsequent communication data arrives, the device-management system manager 430 may select a device-management system 125*b* by determining that it is associated with the serial number stored in the storage 434.

A remote system interface component 432 may be used to interface with the remote system 120 for, for example, speech-recognition. If, for example, the device-management system manager 430 cannot determine which device-management system 125*b* to select, it may send a corresponding request to the remote system 120 to synthesize output speech prompting the user to select a device-management system 125*b*. Similarly, the device-management system manager 430 may receive communication data from the remote system interface component 432 if a command uttered by the user involves one or more device-management system(s) 125*b*. For example, if the user says, "Alexa, check for firmware updates for my doorbell cam," the remote system interface component 432 may send corresponding communication data to the device-management system manager 430 for sending to the appropriate device-management system 125*b*.

FIG. 5 illustrates how NLU processing may be performed on input text data derived from input audio data. The NLU component 460 (such as the one depicted in FIG. 4A) determines a semantic interpretation of text represented in text data. That is, the NLU component 460 determines the meaning behind the text represented in text data based on the individual words. The NLU component 460 interprets the text to derive an intent or a desired action of the user as well as the pertinent pieces of information in the text (e.g., entities) that allow a device (e.g., the user device 110, system 120, skill(s) 490, and/or skill system(s) 125) to complete that action.

The NLU component 460 may process text data to determine several hypotheses of a domain, intent, and/or entity corresponding to a single utterance. For example, if the ASR component 450 outputs ASR results including an N-best list of hypotheses, the NLU component 460 may process the text data with respect to all (or a portion of) the textual interpretations represented therein. The NLU component 460 may annotate text represented in text data by parsing and/or tagging the text. For example, for the text "tell me the weather for Seattle," the NLU component 460 may tag "tell me the weather for Seattle" as a command (e.g., to output weather information) as well as tag "Seattle" as a location for the weather information.

The NLU component 460 may include a shortlister component 550. The shortlister component 550 selects applications that may execute with respect to text data 610 input to the NLU component (e.g., applications that may execute the command). The shortlister component 550 thus limits downstream, more resource intensive NLU processes to being performed with respect to applications that may execute the command.

Without a shortlister component 550, the NLU component 460 may process a given hypothesis with respect to every application of the system, either in parallel, in series, or using some combination thereof. By including a shortlister component 550, the NLU component 460 may process a given hypothesis with respect to only the applications that may execute the command. This reduces total compute power and latency attributed to NLU processing.

The NLU component 460 may include one or more recognizers 563*a*—n. Each recognizer 563 may be associated with a different function, content source, and/or speech-processing system. The NLU component 460 may determine a function potentially associated with the command represented in text data input thereto in order to determine the proper recognizer 563 to process the hypothesis. The NLU component 460 may determine a command represented in text data is potentially associated with more than one function. Multiple recognizers 563 may be functionally linked (e.g., a telephony/communications recognizer and a calendaring recognizer may utilize data from the same contact list).

If the shortlister component 550 determines text corresponding to a hypothesis is potentially associated with multiple skills 490 and/or multiple speech-processing systems, the recognizers 563 associated with the skills 490 and/or multiple speech-processing systems (e.g., the recognizers 563 associated with the applications in the subset selected by the shortlister 550) may process the text. The selected recognizers 563 may process the text in parallel, in series, partially in parallel, etc. For example, if text corresponding to a hypothesis potentially implicates both a communications speech-processing system and a music speech-processing system, a recognizer associated with the communications speech-processing system may process the text in parallel, or partially in parallel, with a recognizer associated with the music application processing the text. The output generated by each recognizer 563 may be scored, with the overall highest scored output from all recognizers 563 ordinarily being selected to be the correct result.

The NLU component 460 may communicate with various storages to determine the potential speech-processing system(s) associated with a command represented in text data. The NLU component 460 may communicate with an NLU storage 573, which includes databases of devices (574*a*-574*n*) identifying functions associated with specific devices. For example, the user device 110 may be associated with speech-processing systems for music, calendaring, contact lists, device-specific communications, etc. In addition, the NLU component 460 may communicate with an entity library 582, which includes database entries about specific services on a specific device, either indexed by device ID, user ID, or group user ID, or some other indicator.

Each recognizer 563 may include a named entity recognition (NER) component 562. The NER component 562 attempts to identify grammars and lexical information that may be used to construe meaning with respect to a command represented in text data input therein. The NER component 562 identifies portions of text represented in text data input into the NLU component 460 that correspond to a named entity that may be recognizable by the system. The NER component 562 (or other component of the NLU component 460) may also determine whether a word refers to an entity that is not explicitly mentioned in the utterance text, for example words such as "him," "her," or "it."

Each recognizer 563, and more specifically each NER component 562, may be associated with a particular grammar model 576, a particular set of intents 578, and a particular personalized lexicon 586. Each gazetteer 584 may include function-indexed lexical information associated with a particular user and/or device. For example, gazetteer A (584*a*) includes function-indexed lexicons 586*aa* to 586*an*. A user's music function lexical information might include album titles, artist names, and song names, for example, whereas a user's contact-list lexical information might include the names of contacts. Since every user's music collection and contact list is presumably different, this personalized information improves entity resolution.

An NER component 562 may apply grammar models 576 and/or lexicons 586 associated with the function (associated with the recognizer 563 implementing the NER component 562) to determine a mention one or more entities in text data input thereto. In this manner, the NER component 562 may identify "slots" (i.e., particular words in text data) that may be needed for later command processing. The NER component 562 may also label each slot with a type of varying levels of specificity (e.g., noun, place, city, artist name, song name, etc.).

Each grammar model 576 may include the names of entities (i.e., nouns) commonly found in text about the particular function to which the grammar model 576 relates, whereas the lexicon 586 is personalized to the user(s) and/or the user device 110 from which the input data or input text data originated. For example, a grammar model 576 associated with a shopping function may include a database of words commonly used when people discuss shopping.

A process called named entity resolution may link a portion of text to an entity known to the system. To perform this named entity resolution, the NLU component 460 may use gazetteer information (584*a*-584*n*) stored in an entity library storage 582. The gazetteer information 584 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 563 may also include an intent classification (IC) component 564. The IC component 564 parses text data to determine an intent(s) of the function associated with the recognizer 563 that potentially corresponds to the text data. An intent corresponds to an action to be performed that is responsive to the command represented by the text data. The IC component 564 may communicate with a database 578 of words linked to intents. For example, a music intent database may link words and phrases such as "quiet," "volume off," and "mute" to a "mute" intent. The IC component 564 identifies potential intents by comparing words in the text data to the words and phrases in an intents database 578 associated with the function that is associated with the recognizer 563 implementing the IC component 564.

The intents identifiable by a specific IC component 564 may be linked to function-specific (i.e., the function associated with the recognizer 563 implementing the IC component 564) grammar model 576 with "slots" to be filled. Each slot of a grammar model 576 may correspond to a portion of the text data that the system believes corresponds to an entity. For example, a grammar model 576 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified object and any object modifier (e.g., a prepositional phrase), such as {Artist Name}, {Album Name}, {Song name}, etc. The NER component 562 may then search corresponding fields in a lexicon 586 associated with the function associated with the recognizer 563 implementing the NER component 562 and may match words and phrases in the text data the NER component 562 previously tagged as a grammatical object or object modifier with those identified in the lexicon 586.

The NER component 562 may perform semantic tagging, which is the labeling of a word or combination of words according to their type/semantic meaning. The NER component 562 may parse text data using heuristic grammar rules, or a model may be constructed using techniques such as hidden Markov models, maximum entropy models, log linear models, conditional random fields (CRF), and the like. For example, an NER component 562 implemented by a music function recognizer 563 may parse and tag text corresponding to "play mother's little helper by the rolling stones" as {Verb}: "Play," {Object}: "mother's little helper," {Object Preposition}: "by," and {Object Modifier}: "the rolling stones." The NER component 562 may identify "Play" as a verb based on a word database associated with the music function, which an IC component 564 (which may also implemented by the music function recognizer 563) may determine that the word corresponds to a <PlayMusic> intent. At this stage, no determination may have been made as to the meaning of "mother's little helper" and "the rolling stones," but based on grammar rules and models, the NER component 562 may have determined that the text of these phrases relates to the grammatical object (i.e., entity) of the text data.

The frameworks linked to the intent may then be used to determine what database fields may be searched to determine the meaning of these phrases, such as searching a user's gazetteer 584 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 584 does not resolve a slot/field using gazetteer information, the NER component 562 may search, in the knowledge base 572, the database of generic words associated with the function. For example, if the text data includes text corresponding to "play songs by the rolling stones," after failing to determine an album name or song name called "songs" by "the rolling stones," the NER component 562 may search the function's vocabulary for the word "songs." In the some embodiments, generic words may be checked before the gazetteer information, or both may be tried, potentially producing two different results.

The NLU component 460 may tag text to attribute meaning to the text. For example, the NLU component 460 may tag "play mother's little helper by the rolling stones" as {intent}: <PlayMusic>, {artist name}: rolling stones, {media type}: SONG, and {song title}: mother's little helper. In another example, the NLU component 460 may tag "play songs by the rolling stones" as {intent}: <PlayMusic>, {artist name}: rolling stones, and {media type}: SONG.

The shortlister component 550 may receive text data 610 output from the ASR component 450 (as illustrated in FIG. 6). The ASR component 450 may embed the text data 610 into a form processable by a trained model(s) using sentence-embedding techniques. Sentence embedding may include, in the text data 610, text in a structure that enables the trained models of the shortlister component 550 to operate on the text. For example, an embedding of the text data 610 may be a vector representation of the text data.

The shortlister component 550 may make binary determinations (e.g., yes or no determinations) regarding which skill(s) 490 relate to the text data 610. The shortlister component 550 may make such determinations using the one or more trained models described herein above. If the shortlister component 550 implements a single trained model for each skill 490, the shortlister component 550 may simply run the models that are associated with enabled applications as indicated in a profile (e.g., profile 502) associated with the user device 110 and/or user that originated the command.

The shortlister component 550 may generate N-best list data representing applications that may execute with respect to the command represented in the text data 610. The size of the N-best list represented in the N-best list data is configurable. In an example, the N-best list data may indicate every application of the system as well as contain an indication, for each application, regarding whether the application is likely capable to execute the command represented in the text data 610. In another example, instead of indicating every application of the system, the N-best list data may only indicate all of the applications that are likely to be able to execute the command represented in the text data 610. In yet another example, the shortlister component 550 may implement thresholding such that the N-best list data may indicate no more than a maximum number of applications that may execute the command represented in the text data 610. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 610 by the shortlister component 550 relative to such applications).

The pruning component 650 creates a new, shorter N-best list (i.e., represented in N-best list data 660 discussed below) based on the N-best list data 640. The pruning component 650 may sort the tagged text represented in the N-best list data 640 according to their respective scores.

The pruning component 650 may perform score thresholding with respect to the N-best list data 640. For example, the pruning component 650 may select entries represented in the N-best list data 640 associated with a score satisfying (e.g., meeting and/or exceeding) a score threshold. The pruning component 650 may also or alternatively perform number of entry thresholding. For example, the pruning component 650 may select the top scoring entry(ies) associated with each different category of function (e.g., music, shopping, communications, etc.) represented in the N-best list data 640, with the new N-best list data 660 including a total number of entries meeting or falling below a threshold number of entries. The purpose of the pruning component 650 is to create a new list of top scoring entries so that downstream, more resource intensive processes may only operate on the tagged text entries that most likely correspond to the command input to the system.

The NLU component 460 may also include a light slot filler component 652. The light slot filler component 652 can take text from slots represented in the tagged text entry or entries output by the pruning component 650 and alter it to make the text more easily processed by downstream components. The light slot filler component 652 may perform low latency operations that do not involve heavy operations such as reference to a knowledge base. The purpose of the light slot filler component 652 is to replace words with other words or values that may be more easily understood by downstream components. For example, if a tagged text entry includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the N-best list data 660.

The NLU component 460 sends the N-best list data 660 to an entity resolution component 670. The entity resolution component 670 can apply rules or other instructions to standardize labels or tokens from previous stages into an intent/slot representation. The precise transformation may depend on the function (e.g., for a travel function, the entity resolution component 670 may transform a text mention of "Boston airport" to the standard BOS three-letter code referring to the airport). The entity resolution component 670 can refer to an authority source (e.g., a knowledge base) that is used to specifically identify the precise entity referred to in each slot of each tagged text entry represented in the N-best list data 660. Specific intent/slot combinations may also be tied to a particular source, which may then be used to resolve the text. In the example "play songs by the stones," the entity resolution component 670 may reference a personal music catalog, Amazon Music account, user profile (described herein), or the like. The entity resolution component 670 may output data including an altered N-best list that is based on the N-best list represented in the N-best list data 660, but also includes more detailed information (e.g., entity IDs) about the specific entities mentioned in the slots and/or more detailed slot data that can eventually be used by a function. The NLU component 460 may include multiple entity resolution components 670 and each entity resolution component 670 may be specific to one or more functions.

The entity resolution component 670 may not be successful in resolving every entity and filling every slot represented in the N-best list data 660. This may result in the entity resolution component 670 outputting incomplete results. The NLU component 460 may include a final ranker component 690, which may consider such errors when determining how to rank the tagged text entries for potential execution. For example, if a book function recognizer 563 outputs a tagged text entry including a <ReadBook> intent flag, but the entity resolution component 670 cannot find a book with a title matching the text of the item, the final ranker component 690 may re-score that particular tagged text entry to be given a lower score. The final ranker component 690 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 690 may apply re-scoring, biasing, or other techniques to obtain the most preferred tagged and resolved text entry. To do so, the final ranker component 690 may consider not only the data output by the entity resolution component 670, but may also consider other data 691. The other data 691 may include a variety of information. For example, the other data 691 may include function rating or popularity data. For example, if one function has a particularly high rating, the final ranker component 690 may increase the score of a tagged text entry or entries associated with or otherwise invoking that particular function. The other data 691 may also include information about functions that have been specifically enabled by the user. For example, the final ranker component 690 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of user device 110, user ID, context, and other information may also be considered. For example, the final ranker component 690 may consider when any particular functions are currently active (e.g., music being played, a game being played, etc.). Following final ranking, the NLU component 460 may output NLU output data 685 to the orchestrator component 440. The NLU output data 685 may include various entries, with each entry representing an NLU processing confidence score, an intent, slot data, and a potential skill or skill that may operating with respect to the respective entry's data.

Following preliminary ranking, the NLU component 460 may output NLU results data 685. The NLU component 460 may send the NLU results data 685 to the orchestrator component 440. The NLU results data 685 may include first NLU results data 685a including tagged text associated with a first speech-processing system, second NLU results data 685b including tagged text associated with a second speech-processing system, etc. The NLU results data 685 may include tagged text data corresponding to the top scoring tagged text entries as determined by the preliminary ranker component 690.

The data 685 output from the NLU component 460 may include an N-best list of NLU results, where each item in the N-best list may correspond to a particular recognizer 563 and corresponding skill 490. Thus, for example, first NLU results of the N-best list may be associated with a first skill 490a, second NLU results of the N-best list may be associated with a second skill 490b, third NLU results of the N-best list may be associated with a third skill 490c, etc. Moreover, the first NLU results may correspond to text tagged to attribute meaning that enables the first skill 490a to execute with respect to the first NLU results, the second NLU results may correspond to text tagged to attribute meaning that enables the second skill 490b to execute with respect to the second NLU results, the third NLU results may correspond to text tagged to attribute meaning that enables the third skill 490c to execute with respect to the third NLU results, etc. The data 685 may also include scores corresponding to each item in the N-best list. Alternatively, the NLU result data 685 output to a particular skill 490 may include NER and IC data output by the particular skill's recognizer 563 while the NLU result data 685 output to the orchestrator component 440 may include only a portion of the NLU result data 685, for example the scores corresponding to certain skills.

The system may be configured with thousands, tens of thousands, etc. skills 490. The orchestrator component 440 enables the system to better determine the best skill 490 to execute the command input to the system. For example, first NLU results may correspond or substantially correspond to second NLU results, even though the first NLU results are operated on by a first skill 490a and the second NLU results are operated on by a second skill 490b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 440 may solicit the first skill 490a and the second skill 490b to provide potential result data based on the first NLU results and the second NLU results, respectively. For example, the orchestrator component 440 may send the first NLU results to the first skill 490a along with a request for the first skill 490a to at least partially execute a command with respect to the first NLU results. The orchestrator component 440 may also send the second NLU results to the second skill 490b along with a request for the second skill 490b to at least partially execute a command with respect to the first NLU results. The orchestrator component 440 receives, from the first skill 490a, first result data generated from the first skill's execution with respect to the first NLU results. The orchestrator component 440 also receives, from the second skill 490b, second results data generated from the second skill's execution with respect to the second NLU results.

The result data 630 may include various components. For example, the result data 630 may include content (e.g., audio data, text data, and/or video data) to be output to a user. The result data 630 may also include a unique identifier (ID) used by the remote system 120 and/or the skill server(s) 125 to locate the data to be output to a user. The result data 630 may also include an instruction. For example, if the command corresponds to "turn on the light," the result data 630 may include an instruction causing the system to turn on a light associated with a profile of the user device 110 and/or user.

A system that does not use the orchestrator component 440 as described above may instead select the highest scored preliminary ranked NLU results data 685 associated with a single skill. The system may send the NLU results data 685 to the skill 490 along with a request for output data. In some situations, the skill 490 may not be able to provide the system with output data. This results in the system indicating to the user that the command could not be processed even though another skill associated with lower ranked NLU results data 685 could have provided output data responsive to the command.

Components of a system that may be used to perform unit selection, parametric TTS processing, and/or model-based audio synthesis are shown in FIG. 7. As shown in FIG. 7, the TTS component 480 may include a TTS front end 716, a speech synthesis engine 718, TTS unit storage 772, TTS parametric storage 780, and a TTS back end 734. The TTS unit storage 772 may include, among other things, voice inventories 778a-288n that may include pre-recorded audio segments (called units) to be used by the unit selection engine 730 when performing unit selection synthesis as described below. The TTS parametric storage 780 may include, among other things, parametric settings 768a-268n that may be used by the parametric synthesis engine 732 when performing parametric synthesis as described below. A particular set of parametric settings 768 may correspond to a particular voice profile (e.g., whispered speech, excited speech, etc.).

In various embodiments of the present invention, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present invention is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 480, within the memory and/or storage of the server 120, device 110, or within an external device.

Text data 710 input into the TTS component 480 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 480 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 480 to craft a natural-sounding audio waveform output. The language dictionary may also include letter-to-sound rules and other tools that may be used to pronounce previously unidentified words or letter combinations that may be encountered by the TTS component 480. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 480. Such acoustic features may include syllable-level features, word-level features, emotion, speaker, accent, language, pitch, energy, duration, and the like. Application of acoustic features may be based on prosodic models available to the TTS component 480. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778a-n). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 412 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 480 may be configured to perform TTS processing in multiple languages. For each language, the TTS component 480 may include specially configured data, instructions and/or components to synthesize speech in the desired language(s). To improve performance, the TTS component 480 may revise/update the contents of the TTS storage 780 based on feedback of the results of TTS processing, thus enabling the TTS component 480 to improve speech recognition.

The TTS storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-278n, where each unit database is configured with a different "voice" to match desired speech qualities. Such voice inventories may also be linked to user accounts. The voice selected by the TTS component 480 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 480 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 412.

When performing unit selection, after a unit is selected by the unit selection engine 730, the audio data corresponding to the unit may be passed to the audio data modification component 720. The audio data modification component 720 may then process the audio data of the unit to create modified audio data where the modified audio data reflects a desired audio quality. The audio data modification component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 780. For each unit that corresponds to the selected portion, the audio data modification component 720 may process the audio data for that unit to create a modified unit audio data. The modified unit audio data may then be concatenated to form the output audio data 412. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 780. In that case, other output data 785 may be output along with the output audio data 412 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 412 may include other output data 785 that may include a prosody tag or other indicator that instructs the device 110 to slow down the playback of the output audio data 412, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

As illustrated in FIG. 8, the user-recognition component 495 may include one or more subcomponents including a vision component 808, an audio component 810, a biometric component 812, a radio-frequency (RF) component 814, a machine-learning (ML) component 816, and a recognition confidence component 818. In some instances, the user-recognition component 495 may monitor data and determinations from one or more subcomponents to determine an identity of one or more users associated with data input to the system. The user-recognition component 495 may output user-recognition data 895, which may include a user identifier associated with a user the system believes is originating data input to the system. The user-recognition data 895 may be used to inform processes performed by the orchestrator 440 (or a subcomponent thereof) as described below.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user-recognition component 495 may utilize determinations from additional components to determine an identity of a user. The vision component 808 can be used in conjunction with other components to determine an identity of a user. For example, the user-recognition component 495 may use data from the vision component 808 with data from the audio component 810 to identify what user's face appears to be speaking at the same time audio is captured by the user device 110 for purposes of identifying a user who spoke an input to the user device 110.

The user device 110 may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user.

The RF component 814 may use RF localization to track devices that a user may carry or wear. For example, a user may be associated with a device. The device may emit RF signals (e.g., Wi-Fi, Bluetooth®, etc.). The user device 110 may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, the user device 110 may include some RF or other detection processing capabilities so that a user who speaks an input may scan, tap, or otherwise acknowledge his/her personal device to the user device 110. In this manner, the user may "register" with the user device 110 for purposes of the user device 110 determining who spoke a particular input. Such a registration may occur prior to, during, or after speaking of an input.

The ML component 816 may track the behavior of various users as a factor in determining a confidence level of the identity of the user. For example, a user may adhere to a regular schedule such that the user is at a first location during the day (e.g., at work or at school). In this example, the ML component 816 factors in past behavior and/or trends into determining the identity of the user that provided input to the user device 110. Thus, the ML component 816 may use historical data and/or usage patterns over time to increase or decrease a confidence level of an identity of a user.

In some instances, the recognition confidence component 818 receives determinations from the various components 808, 810, 812, 814, and 816, and may determine a final confidence level associated with the identity of a user. The confidence level or other score data may be included in the user-recognition data 895.

The audio component 810 may receive data from one or more sensors capable of providing an audio signal (e.g., one or more microphones) to facilitate recognizing a user. The audio component 810 may perform audio recognition on an audio signal to determine an identity of the user and associated user identifier. In some instances, the audio component 810 may perform voice recognition to determine an identity of a user.

The audio component 810 may also perform user identification based on audio received by the user device 110. The audio component 810 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 810 may perform user recognition by comparing audio characteristics representing the audio to stored audio characteristics of users.

Figure 9:
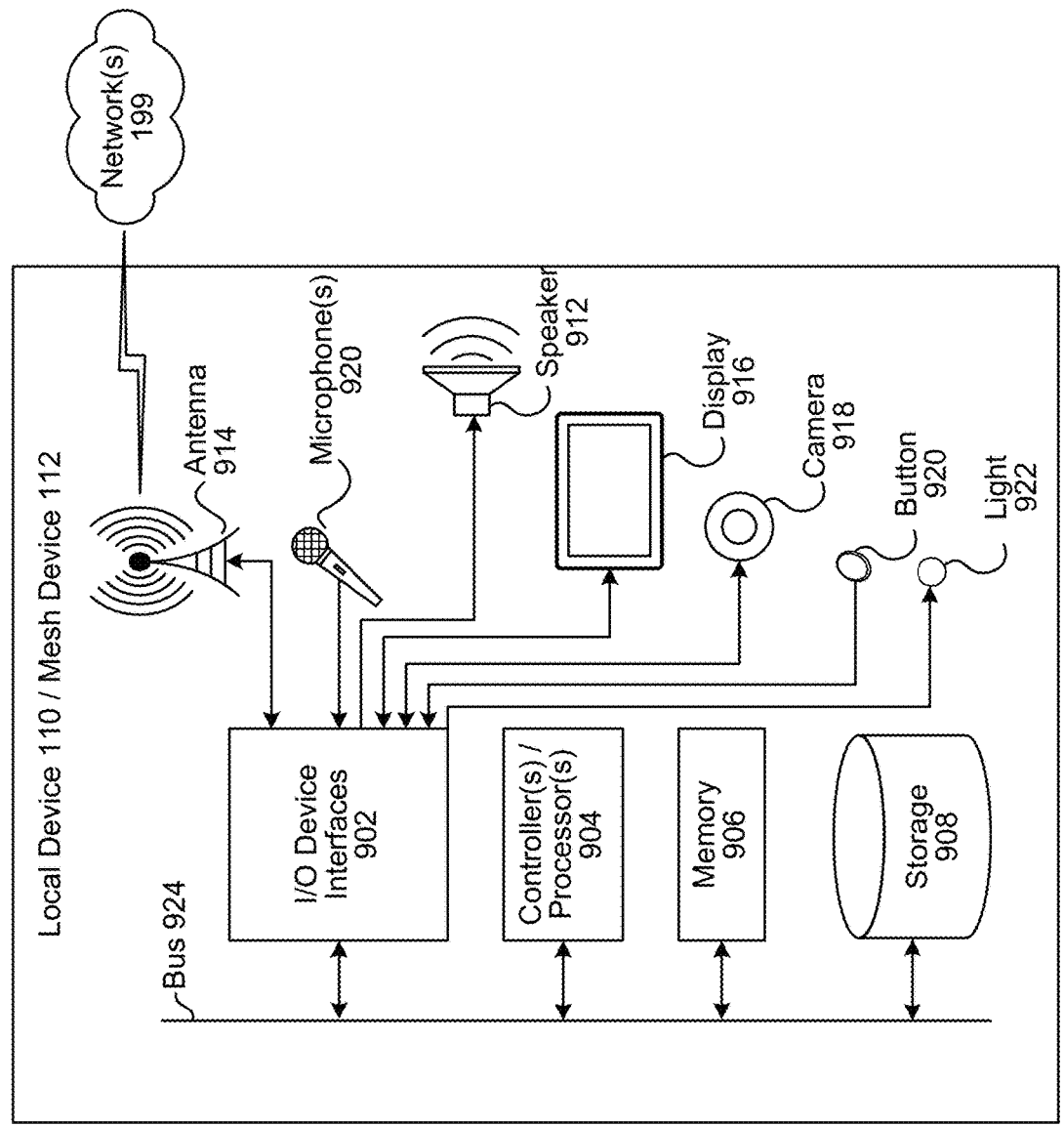
FIG. 9 illustrates example components of a user device according to embodiments of the present disclosure.
Figure 10:
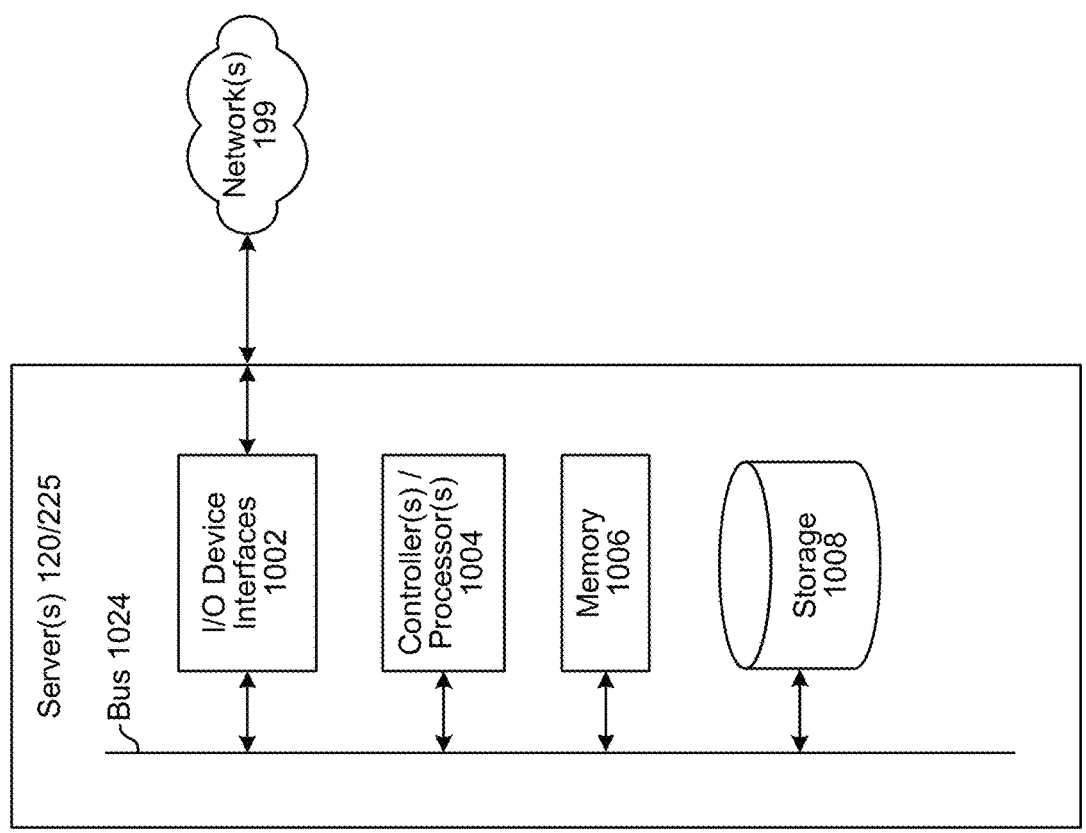
FIG. 10 illustrates example components of a remote system according to embodiments of the present disclosure.

FIG. 9 is a block diagram conceptually illustrating a user device 110 (and/or mesh device 112) that may be used with the system. FIG. 10 is a block diagram conceptually illustrating example components of a remote device, such as the system(s) 120, which may assist with ASR processing, NLU processing, etc., and the skill system(s) 125. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/125) may be included in the system, such as one or more servers 120 for performing ASR processing, one or more servers 120 for performing NLU processing, one or more skill system(s) 125 for communicating with mesh devices 112, etc. In operation, each of these devices (or groups of devices) may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (902/1002), processor(s) (904/1004), memory (906/1006), and/or storage (908/1008) of the device(s) 110 system(s) 120, or the skill system(s) 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the system(s) 120, and the skill system(s) 125, as described herein, are illustrative, and may be located as a stand-alone device or may be included, in whole or in part, as a component of a larger device or system.

As illustrated in FIG. 11, multiple mesh devices (112a-112d) may be connected to the user device 110 via one or more mesh networks; the user device may be connected over a network(s) 199 to a remote system 120, a device-management system 125b, and/or a device-communication system 125a. The network(s) 199 may include a local or private network or may include a wide network such as the Internet. Devices may be connected to the network(s) 199 through either wired or wireless connections; other devices may be connected via mesh networks. For example, a camera 112a, an electrical outlet 112b, a light bulb 112c, and a washer/dryer 110d may be connected to the network(s) 199 through the user device 110.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at a first system from a user device, first data corresponding to a first device;
   determining, based on the first data, a second system associated with the first device;
   determining, by the first system, that the first data includes a representation of a command corresponding to the second system;
   sending, from the first system to the second system, second data corresponding to the first device;
   receiving, from the second system at the first system via a first network protocol, third data including:
      a first portion comprising first header information corresponding to the first network protocol, and
      a second portion representing the command and corresponding to a second network protocol;
   sending, from the first system to the user device, the third data; and
   causing the user device to send, to the first device via the second network protocol, fourth data including:
      a third portion comprising second header information corresponding to the second network protocol, and
      the second portion.

2. The computer-implemented method of claim 1, further comprising:
   receiving, at the user device from the first device via the second network protocol, identification data identifying the first device;
   sending, from the user device to the first device via the second network protocol, a request for additional identification data;
   receiving, at the user device from the first device via the second network protocol, the additional identification data identifying the first device; and
   sending, from the user device to the first system via the first network protocol, the first data comprising at least the identification data and the additional identification data.

3. The computer-implemented method of claim 1, further comprising:
   receiving, at the first system from the second system, communication data corresponding to the first device;
   determining, by the first system, that the first device corresponds to the user device and a second user device; and
   sending, from the first system to the user device and the second user device, processed communication data corresponding to the communication data.

4. The computer-implemented method of claim 3, further comprising:
   determining, by the user device, that the first device corresponds to the second network protocol; and
   sending, from the user device to the first device via the second network protocol, the processed communication data.

5. The computer-implemented method of claim 3, further comprising:

after sending the processed communication data, deleting, by the first system, the communication data and the processed communication data, wherein at least a portion of the communication data is encrypted by the second system.

6. The computer-implemented method of claim 1, further comprising:

prior to sending the second data to the second system, outputting, by the user device, output corresponding a request to register the first device;

receiving, by the user device, fifth data representing a response to the request;

sending, from the user device to a remote system, the fifth data; and determining, by the remote system, that the fifth data corresponds to confirmation of the request to register.

7. The computer-implemented method of claim 1, further comprising:

processing, by the first system, the first data to determine device data identifying the first device;

determining a first candidate second system;

determining a second candidate second system;

sending, to a remote system, an indication of a first candidate system and a second candidate system;

causing output, by the remote system at the user device, of a prompt including the first and second candidate systems; and determining that input data captured by the user device includes a representation of the second system.

8. The computer-implemented method of claim 1, further comprising:

receiving, at the user device, audio data corresponding to an utterance;

determining, by a remote system, that the utterance corresponds to the second system; and causing the first system to process a command represented by the utterance.

9. A computing device comprising:

at least one processor; and at least one memory including instructions that, when executed by the at least one processor, cause the computing device to:

receive, at a first system from a user device, first data corresponding to a first device;

determine, based on the first data, a second system associated with the first device;

determine, by the first system, that the first data includes a representation of a command corresponding to the second system;

send, from the first system to the second system, second data corresponding to the first device;

receive, from the second system at the first system via a first network protocol, third data including:

a first portion comprising first header information corresponding to the first network protocol, and a second portion representing the command and corresponding to a second network protocol;

send, from the first system to the user device, the third data; and cause the user device to send, to the first device via the second network protocol, fourth data including:

a third portion comprising second header information corresponding to the second network protocol, and the second portion.

10. The computing device of claim 9, wherein the at least one memory further includes instructions that, when executed by the at least one processor, further cause the computing device to:

receive, at the user device from the first device via the second network protocol, identification data identifying the first device;

send, from the user device to the first device via the second network protocol, a request for additional identification data;

receive, at the user device from the first device via the second network protocol, the additional identification data identifying the first device; and send, from the user device to the first system via the first network protocol, the first data comprising at least the identification data and the additional identification data.

11. The computing device of claim 9, wherein the at least one memory further includes instructions that, when executed by the at least one processor, further cause the computing device to:

receive, at the first system from the second system, communication data corresponding to the first device;

determine, by the first system, that the first device corresponds to the user device and a second user device; and send, from the first system to the user device and the second user device, processed communication data corresponding to the communication data.

12. The computing device of claim 11, wherein the at least one memory further includes instructions that, when executed by the at least one processor, further cause the computing device to:

determine, by the user device, that the first device corresponds to the second network protocol; and send, from the user device to the first device via the second network protocol, the processed communication data.

13. The computing device of claim 11, wherein the at least one memory further includes instructions that, when executed by the at least one processor, further cause the computing device to:

after sending the processed communication data, delete, by the first system, the communication data and the processed communication data, wherein at least a portion of the communication data is encrypted by the second system.

14. The computing device of claim 9, wherein the at least one memory further includes instructions that, when executed by the at least one processor, further cause the computing device to:

prior to sending the second data to the second system, output, by the user device, output corresponding a request to register the first device;

receive, by the user device, fifth data representing a response to the request;

send, from the user device to a remote system, the fifth data; and determine, by the remote system, that the fifth data corresponds to confirmation of the request to register.

15. The computing device of claim 9, wherein the at least one memory further includes instructions that, when executed by the at least one processor, further cause the computing device to:

process, by the first system, the first data to determine device data identifying the first device;

determine a first candidate second system;

determine a second candidate second system;

send, to a remote system, an indication of a first candidate system and a second candidate systems;

cause output, by the remote system at the user device, of a prompt including the first and second candidate systems; and determine that input data captured by the user device includes a representation of the second system.

16. The computing device of claim 9, wherein the at least one memory further includes instructions that, when executed by the at least one processor, further cause the computing device to:

receive, at the user device, audio data corresponding to an utterance;

determine, by a remote system, that the utterance corresponds to the second system; and cause the first system to process a command represented by the utterance.

\* \* \* \* \*